(12) United States Patent
O'Sullivan et al.

(10) Patent No.: US 11,623,675 B1
(45) Date of Patent: Apr. 11, 2023

(54) INTELLIGENT RAILROAD AT-GRADE CROSSINGS

(71) Applicant: Cavnue Technology, LLC, Arlington, VA (US)

(72) Inventors: Mathew O'Sullivan, Evanston, IL (US); David Kiley, Washington, DC (US)

(73) Assignee: Cavnue Technology, LLC, Arlington, VA (US)

( * ) Notice: Subject to any disclaimer, the term of this patent is extended or adjusted under 35 U.S.C. 154(b) by 0 days.

(21) Appl. No.: 18/047,901

(22) Filed: Oct. 19, 2022

(51) Int. Cl.
| | |
|---|---|
| *G06F 7/70* | (2006.01) |
| *B61L 29/08* | (2006.01) |
| *G08G 1/04* | (2006.01) |
| *B61L 25/02* | (2006.01) |
| *G08G 1/00* | (2006.01) |
| *G08G 1/056* | (2006.01) |

(52) U.S. Cl.
CPC ............. *B61L 29/08* (2013.01); *B61L 25/023* (2013.01); *G08G 1/04* (2013.01); *G08G 1/056* (2013.01); *G08G 1/22* (2013.01); *G06F 2218/08* (2023.01)

(58) Field of Classification Search
CPC ......... B61L 29/08; B61L 25/023; G08G 1/04; G08G 1/056; G08G 1/22; G06F 2218/08; G06F 19/00; G06F 7/70
USPC ........................................................ 701/117
See application file for complete search history.

(56) References Cited

U.S. PATENT DOCUMENTS

| | | |
|---|---|---|
| 6,263,799 B1 | 7/2001 | Pardes |
| 7,302,319 B2 | 11/2007 | Wu |
| 7,832,691 B2 | 11/2010 | Reibeling et al. |
| 8,157,219 B2 | 4/2012 | Ashraf et al. |
| 9,415,783 B2 * | 8/2016 | Kissel, Jr. ............... E01B 25/00 |
| 9,802,630 B2 | 10/2017 | Bartolotti |
| 10,453,352 B1 * | 10/2019 | Hayward ............... G01C 21/36 |
| 10,899,350 B2 | 1/2021 | Schoenly |
| 10,899,374 B2 | 1/2021 | Hilleary |
| 11,138,873 B1 | 10/2021 | Clifford |

(Continued)

OTHER PUBLICATIONS

Cavnue LLC, "Autonomous Trucking on Rail Rights of Way," Jul. 2021, 10 pages.

(Continued)

*Primary Examiner* — Shardul D Patel
(74) *Attorney, Agent, or Firm* — Fish & Richardson P.C.

(57) ABSTRACT

Methods, systems, and apparatus, including computer programs encoded on computer storage media, for monitoring vehicles traversing a dedicated roadway that includes an at-grade crossing. In some implementations, a system includes a central server, a gate system, and sensors. The gate system provides access to an at-grade crossing for vehicles. The sensors are positioned in a fixed location relative to a roadway, the roadway including the at-grade crossing. Each sensor can detect vehicles on the roadway. For each vehicle, each sensor can generate sensor data and observational data from the generated sensor data. Each sensor can determine a likelihood that the detected vehicle will approach the at-grade crossing by comparing the likelihood to a threshold. In response, each sensor can transmit data to the gate system that causes the gate system to allow the autonomous vehicle access to the at-grade crossing prior to the autonomous vehicle reaching the gate system.

20 Claims, 4 Drawing Sheets

(56) References Cited

U.S. PATENT DOCUMENTS

| | | | |
|---|---|---|---|
| 2008/0185482 A1 | 8/2008 | Ghigliotti | |
| 2013/0194423 A1* | 8/2013 | Baines | B61L 23/00 |
| | | | 348/148 |
| 2013/0200223 A1 | 8/2013 | Alexander et al. | |
| 2013/0289805 A1 | 10/2013 | Makkinejad | |
| 2016/0231746 A1 | 8/2016 | Hazelton et al. | |
| 2018/0018888 A1 | 1/2018 | Townsend | |
| 2018/0208223 A1* | 7/2018 | Israelsson | B61L 29/22 |
| 2019/0145791 A1* | 5/2019 | Rempel | G08G 1/0116 |
| | | | 701/410 |
| 2020/0377128 A1* | 12/2020 | Marczuk | G06Q 50/30 |
| 2020/0398877 A1* | 12/2020 | White | B61L 29/00 |
| 2021/0041877 A1* | 2/2021 | Lacaze | G06V 20/13 |
| 2021/0142684 A1* | 5/2021 | Hilleary | B61L 29/22 |

OTHER PUBLICATIONS dot.alaska.gov [online], "Enjoy the unique experience of a trip to Whittier, Alaska, driving the longest combined vehicle-railroad tunnel in North America!" Sep. 28, 2013, retrieved on Aug. 9, 2022, retrieved from URL<https://dot.alaska.gov/creg/whittiertunnel/>, 2 pages.

\* cited by examiner

INTELLIGENT RAILROAD AT-GRADE CROSSINGS

TECHNICAL FIELD

This specification generally relates to road surveillance, and one particular implementation relates to monitoring a dedicated roadway that includes a railroad crossing.

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this application is related to a system that monitors autonomous vehicles traversing a dedicated roadway and the dedicated roadway can include one or more at-grade crossings. An at-grade crossing can include an intersection between one or more roads on a surface, one or more railways on the surface, or a combination of roads and railways on the surface. The system can perform various functions: determine a likelihood that the autonomous vehicles traversing the dedicated roadway seek to access the at-grade crossing, enable access to the autonomous vehicles that are likely to traverse the at-grade crossing, and monitor the autonomous vehicles safe navigation through the at-grade crossing. The system can utilize one or more sensors placed along the dedicated roadway to detect one or more autonomous vehicles traversing the dedicated roadway and make intelligent decisions regarding autonomous vehicles' access at the at-grade crossing.

In some implementations, the dedicated roadway may include one or more gate systems that enable the autonomous vehicle to access each of the one or more at-grade crossings, respectively. The gate system can also prevent the autonomous vehicles from accessing the at-grade crossing when one or more trains traverse a railroad that crosses the at-grade crossing or when the one or more trains are traveling towards the at-grade crossing. The gate systems can communicate with the one or more sensors. The communications can include, for example, an indication that one or more autonomous vehicles are seeking to access the at-grade crossing and an instruction indicating whether to provide these vehicles with access or to not provide these vehicles with access. The gate systems can enable the autonomous vehicles' access to the at-grade crossing by opening a gate or preventing the autonomous vehicles' access to the at-grade crossing by maintaining a closed gate.

In some implementations, the dedicated roadway can run in parallel to the railroad. In some implementations, the dedicated roadway can run in parallel to the railroad and can intersect the railroad at one or more intersection points, e.g., one or more at-grade crossings. The system can charge a toll or another fee to the autonomous vehicles moving along the dedicated roadway and/or for accessing each of the at-grade crossings. The charged tolls can be used to generate revenue for a railroad operator, e.g., potentially at a higher operating margin than what the railroad is typically able to charge for railway operation—without materially adversely impacting the existing the rail business. In this manner, introducing tolled autonomous freight infrastructure can be accretive to the value of the railroad system.

For example, a railroad may include the Lehigh Railway located in Pennsylvania, which is a short-line railroad that covers 56 miles. The Lehigh Railway connects between the Reading Blue Mountain and the Northern Railroad along the Susquehanna River. In some cases, the Lehigh Railway can run anywhere between ten to thirty trains per day. However, this utilization can fluctuate. A parallel roadway or one or more at-grade crossings with the railroad that enables toll charging of autonomous vehicles, e.g., autonomous trucks, carrying good that may not otherwise travel on the Lehigh Railway unlocks an ancillary source of revenue, offsetting days when the railroad is underutilized and enabling autonomous vehicles to travel shorter distances to reach their destination by traversing at-grade crossings over the railroad.

The system described in this application can support the safe movement of autonomous vehicles on rail rights of way and charge a toll for autonomous vehicles to operate on the dedicated roadway. Moreover, the system described can support the safe movement of autonomous vehicles seeking to access one or more at-grade crossings on the dedicated roadway and can enable their safe passage through the at-grade crossings. By charging a toll for autonomous vehicles to move goods from points A to point B alongside the railroad or across the railroad at an at-grade crossing, the railroad operator can unlock incremental value at potentially accretive margins versus when operating as a railroad alone. At the same time, within the autonomous trucking, for example, market, there are significant risks to deploying autonomous trucks on active roadways due to safety issues, complexity risks, and operational challenges, to name a few examples. Further, significant risks exist with deploying autonomous trucks to navigate at-grade crossings with potential oncoming trains.

By having a dedicated roadway that connects a key freight corridor that runs in parallel to a railroad right of way and by monitoring one or more at-grade crossings on the dedicated roadway, a significant advantage exists for autonomous freight operators for deploying autonomous trucks within a controlled operating environment that improves reliability, safety, and an ability for autonomous trucks to move goods commercially and at scale. As a result, by providing a parallel-dedicated lane for autonomous trucking and providing at-grade crossings at various locations on the parallel-dedicated lane, the system can convert legacy underutilized railroad right of way assets into advance freight corridors that deliver right of way monetization and increase value for railroad operators while at the same time, delivering improved and accelerated deployment of autonomy for trucking and other autonomous vehicle fleets.

In some implementations, the system can incorporate various sensors placed in a longitudinal manner along the parallel roadway for monitoring the vehicles, their position, their movement amongst other vehicles, and for charging a toll on the vehicles for using the parallel roadway and/or for accessing the one or more at-grade crossings. The sensors can be placed on both sides of the parallel roadway and alongside the at-grade crossings. The sensors can communicate with one another, communicate with one or more trains on the railroads, communicate with the autonomous vehicles, and communicate with an external central server, to name some examples. Each sensor can include their respective field of view for monitoring a designated area on the parallel roadway and the at-grade crossing. These sensors can be spaced at a predetermined distance apart from one another alongside the roadway. The sensors can include a combination of LIDAR systems, high definition (HD) video cameras, weather monitoring devices, a radar system, a Cellular Vehicle-to-Infrastructure (C-V2X) system, and a Wi-Fi system, to name a few examples.

The sensors can, for example, generate observations regarding road actors, e.g., vehicles, objects, or people, traversing on the parallel roadway and seeking to access the at-grade crossings. The sensors can calculate characteristics about the vehicular traffic, e.g., vehicle dynamics, each relating to the vehicles on the parallel roadway. The sensors can identify an object as the objet enters the sensors' field of view. Based on the identification of the object, the sensors can further describe a location of the vehicles along the roadway, a speed of the vehicle, a relationship of the vehicle to another vehicle, e.g., vehicle headway describing distance and time between two moving vehicles, and others, to name some examples.

In some implementations, the sensors can monitor and analyze the dynamics of the vehicles on the parallel roadway to make predictions about the vehicles' movement. Specifically, the sensors can determine from a location of the vehicle, a distance of the vehicle to the at-grade crossing, a direction the vehicle is currently moving, and other characteristics of the vehicle, whether the vehicle is likely to access one or more at-grade crossings on the dedicated roadway. In some examples, the sensors can rely on a trained machine-learning model to predict a likelihood that a detected vehicle will seek to access an at-grade crossing.

In some examples, the sensors can provide the recorded data to the external central server. The external central server can provide the recorded data to the trained machine-learning model to predict the likelihood that the detected vehicle will seek to access the at-grade crossing. If the likelihood satisfies a threshold value, e.g., greater than or equal to the threshold value, the sensors and/or the central server can communicate with a gate system instructing the gate system to provide the detected vehicle with access to the at-grade crossing. In some examples, the sensors and/or the central server can transmit the instructions to the gate system prior to the detected vehicle reaching the gate system.

The gate system can include one or more components that enable autonomous vehicles' access to the at-grade crossing. The gate system can receive sensor data from the sensors and data from the external central server that indicates whether to open a gate or maintains a gate's closure. For example, the gate system can receive sensor data that indicates an autonomous vehicle is approaching and to open a gate for a predetermined period of time, e.g., 10 seconds. In some examples, the gate system can receive sensor data that indicates an autonomous vehicle is approaching and a train is near the at-grade crossing, so the gate system should remain closed until a subsequent message is received. Other examples are also possible. The gate system can also maintain its gate's closure until a characteristic of the approaching vehicle satisfies a particular criteria. After the autonomous vehicle has passed through the gate of the gate system, the gate system can close access to the at-grade crossing to the next approaching vehicle or can stay open for the next approaching vehicle in a platooning mode. In some examples, the gate system can open once the next approaching vehicle has met various requirements set forth by the sensors and/or external central server for accessing the at-grade crossing.

In one general aspect, a method is performed by one or more processors. The method includes: providing, by a gate system, access for autonomous vehicles to an at-grade crossing; detecting, by each sensor in a plurality of sensors positioned in a fixed location relative to a roadway, one or more autonomous vehicles in a field of view on the roadway, and for each detected autonomous vehicle: generating sensor data indicative of the detected autonomous vehicle; generating observational data based on the generated sensor data; determining, from the generated sensor data and the generated observational data, a likelihood that the detected autonomous vehicle will approach the at-grade crossing; comparing the likelihood that the detected autonomous vehicle will approach the at-grade crossing to a threshold value; and in response to determining that the likelihood satisfies the threshold value, transmitting data to the gate system that causes the gate system to allow the detected autonomous vehicle access to the at-grade crossing prior to the detected autonomous vehicle reaching the gate system.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the at-grade crossing includes a railroad crossing between a first roadway and a second roadway.

In some implementations, the autonomous vehicles that traverse the roadway include autonomous trucks.

In some implementations, the method further includes: receiving, at an interface system, data from a railroad system that manages a railroad; and displaying, at the interface system, data related to one or more trains that traverse the railroad that traverses the at-grade crossing, the data comprising a number of the one or more trains that traverse the railroad, a direction of the one or more trains traveling the railroad, a number of railroads, and prior train utilization on the railroad.

In some implementations, generating the sensor data indicative of the detected autonomous vehicle further includes: determining, by the plurality of sensors, one or more features of the detected vehicle; determining, by the plurality of sensors, an identity of the detected vehicle using the one or more features, wherein the one or more features comprise a color of the detected vehicle, a class of the detected vehicle, and a volume of the detected vehicle; and determining, by the plurality of sensors, characteristics of a movement of the detected vehicle, wherein the characteristics comprise (i) a direction of the movement, (ii) a velocity of the movement, (iii) an acceleration of the movement, (iv) a prior path taken while traversing the roadway.

In some implementations, generating the observational data based on the generated sensor data further includes: determining, by the plurality of sensors, a location of the at-grade crossing on the roadway; determining, by the plurality of sensors, a distance and direction of the at-grade crossing in relation to a location of the detected vehicle; and determining, by the plurality of sensors, traffic characteristics on the roadway, wherein the traffic characteristics comprise (i) velocity of other vehicles traversing the roadway, (ii) a movement direction for each vehicle of the other vehicles, and (iii) objects on the roadway that hinder traffic movement.

In some implementations, determining, from the generated sensor data and the generated observational data, the likelihood that the detected autonomous vehicle will approach the at-grade crossing further includes: providing, by the plurality of sensors, (i) data indicative of the generated observational data, (ii) data indicative of the generated sensor data, and (iii) data identifying the detected vehicle using a trained machine-learning model, as input to a trained machine-learning model, the trained machine-learning model configured to produce the likelihood that the detected autonomous vehicle will approach the at-grade crossing; and obtaining, by the plurality of sensors, as output from the trained machine-learning model, the likelihood that the detected autonomous vehicle will approach the at-grade crossing prior to the detected autonomous vehicle approaching the at-grade crossing.

In some implementations, the method further includes: acquiring, by the plurality of sensors, sensor data of one or more trains traversing a railroad prior to or after the at-grade crossing; determining, by the plurality of sensors and from the acquired sensor data, a direction of the one or more trains traversing the railroad; in response to determining (i) the direction of the one or more trains indicates the one or more trains are traversing towards the at-grade crossing and (ii) the likelihood that the detected autonomous vehicle will approach the at-grade crossing satisfies the threshold value, determining, by the plurality of sensors and using the acquired sensor data, (iii) a distance the one or more trains are from the at-grade crossing and (iv) a speed of the one or more trains; determining, by the plurality of sensors, whether to provide the detected autonomous vehicle access to the at-grade crossing prior to the one or more trains traversing the at-grade crossing based on (iii) the distance the one or more trains are from the at-grade crossing and (iv) the speed of the one or more trains; and in response to determining that the detected autonomous vehicle is not provided access to the at-grade crossing prior to the one or more trains traversing the at-grade crossing, instructing, by the plurality of sensors, the detected autonomous vehicle to wait at the gate system.

In some implementations, in response to determining that the detected autonomous is provided access to the at-grade crossing prior to the one or more trains traversing the at-grade crossing, the method includes: transmitting, by the plurality of sensors, data to the gate system that causes the gate system to allow the detected autonomous vehicle access to the at-grade crossing prior to the detected autonomous vehicle reaching the gate system and prior to the one or more trains reaching the at-grade crossing; and transmitting, by the plurality of sensors and to the detected autonomous vehicle, data indicative of safe passage across the at-grade crossing.

In some implementations, in response to determining, using the acquired sensor data, (iii) the distance the one or more trains are from the at-grade crossing and (iv) the speed of the one or more trains, the method includes: determining, by the plurality of sensors, a prior number of openings of the gate system over a prior predetermined time period; in response to determining the prior number of openings of the gate system over the prior predetermined time period satisfies a second threshold, transmitting, by the plurality of sensors, data to the detected autonomous vehicle to activate platooning mode, wherein the platooning mode instructs the autonomous vehicle to wait to access the at-grade crossing until a predetermined number of autonomous vehicles have platooned with the detected autonomous vehicle; detecting, by the plurality of sensors, the number of autonomous vehicles in the platooning mode satisfies a third threshold value; transmitting, by the plurality of sensors, data to the gate system the causes the gate system to allow the platooned autonomous vehicles access to the at-grade crossing; and transmitting, by the plurality of sensors, data to each autonomous vehicle of the platooned autonomous vehicle indicative of safe passage across the at-grade crossing.

In some implementations, in response to determining whether to provide the detected autonomous vehicle access to the at-grade crossing prior to the one or more trains traversing the at-grade crossing based on (iii) the distance the one or more trains are from the at-grade crossing and (iv) the speed of the one or more trains, the method includes: determining, by the plurality of sensors, a current speed of the detected vehicle approaching the gate system; determining, by the plurality of sensors, the current speed of the detected vehicle is not sufficient to traverse the at-grade crossing prior to the one or more trains traversing the at-grade crossing; determining, by the plurality of sensors, a new speed for the detected vehicle that is sufficient to traverse the at-grade crossing prior to the one or more trains traversing the at-grade crossing; transmitting, by the plurality of sensors, the new speed to the detected vehicle; in response to transmitting the new speed to the detected vehicle, detecting, by the plurality of sensors, the current speed of the detected vehicle matches to the transmitted new speed; and in response to detecting the current speed of the detected vehicle matches to the transmitted new speed, transmitting, by the plurality of sensors, data to the gate system that causes the gate system to allow the detected vehicle access to cross the at-grade crossing.

The subject matter described in this specification can be implemented in various embodiments and may result in one or more of the following advantages. By incorporating at-grade crossings on to the dedicated roadway that is controlled by sensors and a gate system, the system can ensure that the autonomous vehicles' traversing of the at-grade crossings are performed in a controlled manner that does not routinely disrupt traffic. Similarly, the system can ensure that the autonomous vehicles' traversing of the at-grade crossing does not disrupt railroad operations. These crossings can be managed to avoid disrupting traffic and railroad operations while maintaining high delivery of goods transportation by performing platooning of autonomous vehicles, enabling crossings at low activity times, and other traffic assistance activities.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
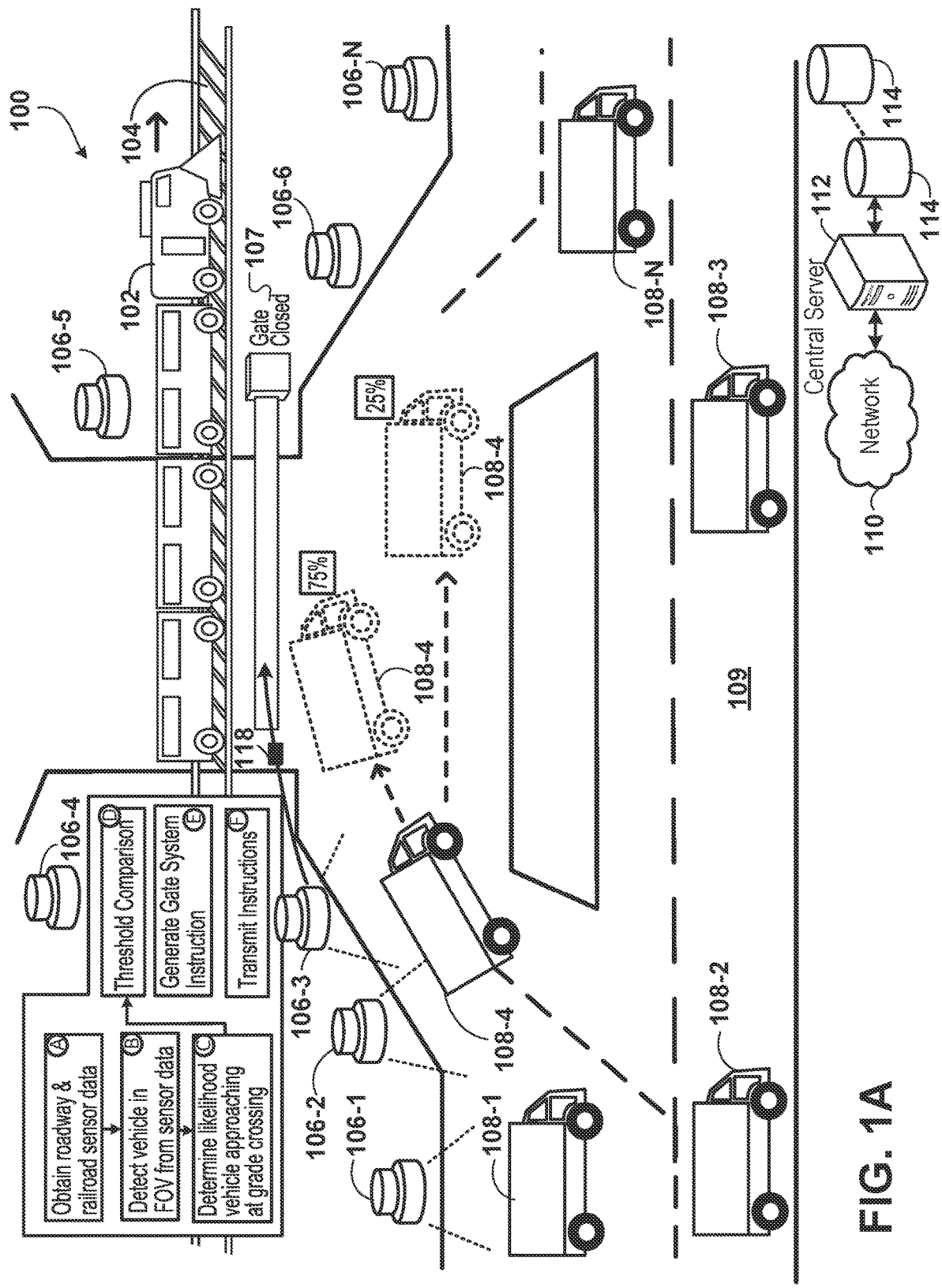
FIG. 1A is a block diagram that illustrates an example of a system for monitoring autonomous vehicles traversing a dedicated roadway that includes an at-grade crossing.

FIG. 1A is a block diagram that illustrates an example of a system 100 for monitoring autonomous vehicles traversing a dedicated roadway that includes an at-grade crossing. The system 100 includes roadway 109 on which autonomous vehicles 108-1 through vehicle 108-N (collectively "vehicles 108") travel. The system 100 also includes a plurality of sensors 106-1 through 106-N (collectively "sensors 106"), a network 110, a central server 112, various database 114, a train 102, and a railroad 104.

In the example of system 100, the system 100 illustrates the process performed by the sensors 106 and the central server 112. The system 100 illustrates five vehicles and seven sensors, but there may be more or less sensors and more or less vehicles, in other configurations. For example, there may be configurations where the sensors are placed on different sides of dedicated roadway 109 and spaced at different differences between one another. Moreover, the roadway 109 shown in system 100 illustrates multiple lanes in a single direction. In some example, the roadway 109 may alternatively or additionally include more or less lanes having autonomous vehicles 108 travel in the same direction as well as more than one lane of vehicles traveling in opposing directions. FIG. 1A illustrates various operations in stages (A) through (F), which can be performed in the sequence indicated, in another sequence, with additional stages, or with fewer stages, to name some examples.

In general, the system 100 can provide techniques for monitoring autonomous vehicles 108 traversing the dedicated roadway 109 and for making intelligent decisions about those vehicles seeking to access the one or more at-grade crossings. The roadway 109 can include one or more at-grade crossings, which an autonomous vehicle may seek to traverse to access a roadway on the opposite side of railroad 104, for example. The at-grade crossing can include an intersection between one or more roadways on a surface or on different surfaces that intersect, can include one or more railroads that intersect, or a combination of railroads and roadways that intersect.

In some implementations, the roadway 109 can include one or more lanes that run in parallel to the railroad 104. The roadway 109 can include one or more lanes that run in parallel to or run over top of railroad 104. The roadway 109 can include a special roadway that charges a toll for vehicular access. The autonomous vehicles 108 can access the roadway 109 be entering through a specific location with a toll charging point and can egress the roadway 109 through a separate toll charging point. The two toll charging points can be used to identify an amount to charge the autonomous vehicle for a distance of traversing the roadway 109. In some examples, the autonomous vehicles 108 can be charged a toll for traversing an access point on the roadway 109.

In some implementations, the system 100 can be used in a drayage environment. In a drayage environment, trains and/or autonomous vehicles, e.g., autonomous trucks, can transport goods over short distances. For example, the goods can be transmitted from a ship that has entered at seaport to a warehouse, or from an inland port to a warehouse. The system 100 can utilize drayage in transferring shipments or goods using various forms of transportation.

The system 100 enables monitoring vehicles 108 traversing the roadway 109. In some examples, the vehicles 108 can include autonomous vehicles or vehicles controlled by humans. The autonomous vehicles 108 can include and utilize one or more trained machine-learning models and an onboard sensor processing systems. Functionally, the one or more trained machine-learning models can execute in conjunction with the onboard sensor processing system to provide navigation and driving capabilities for the autonomous vehicles 108.

The autonomous vehicles 108 can obtain sensor data from its one or more sensors that communicate with an onboard sensor processing system and use the obtained sensor data to navigate the roadway 109. For example, the autonomous vehicle 108-1 can analyze the obtained sensor data by providing the obtained sensor data as input to its one or more trained machine-learning models. The one or more trained machine-learning models can output a likelihood detection of an event, a classification of one or more objects illustrated in the sensor data, and other likelihoods of detected events. In response, the autonomous vehicles 108-1's route guidance system can analyze the output from the one or more trained machine-learning models to decide actions for the autonomous vehicle 108-1. These actions can include, for example, turn left, turn right, accelerate, decelerate, stop, reverse, and maintain speed, to name some examples.

The sensors 106 can include a variety of software and hardware devices that monitor objects on the roadway 109. For example, the sensors 106 can include a LIDAR system, a video camera, a radar system, a Cellular Vehicle-to-Infrastructure (C-V2X) system, weather components, and a Wi-Fi system, to name a few examples. In some implementations, a sensor can include a combination of varying sensor types. For example, sensor 106-2 can include a video camera, a Wi-Fi system, and a radar system; sensor 106-1 can include a video camera system and a LIDAR system; and sensor 106-4 can include a C-V2X system, a LIDAR system, and a Wi-Fi system. Other device combinations can be included within each of the sensors.

A sensor can detect and track objects on the roadway 109 through its field of view. Each sensor can have a field of view set by a designer of system 100. For example, if sensor 106-1 includes a video camera, the field of view of the video camera can be based on the type of lens used, e.g., wide angle, normal view, and telephoto, for example, and the depth of the camera field, e.g., 20 meters, 30 meters, and 60 meters, for example. Other parameters for each sensor in system 100 can also be designated. For example, if the sensor 106-2 includes a LIDAR system, then the parameters required for its use would include a point density distribution, e.g., a distribution of the point cloud, a field of view, e.g., an angle the LIDAR system can view over, and line overlap, e.g., a measure to be applied that affects ground coverage. Other parameters for each of the sensor devices are also possible.

The field of view of each sensor also becomes important because the system 100 can be designed in a variety of ways to enhance monitoring of stationary and moving objects on the roadway 109. For example, a designer may seek to overlap fields of view of adjacent sensors 106 to ensure continuity for viewing the roadway 109 in its entirety. Overlapping fields of view regions may facilitate monitoring areas where objects enter the roadway 109 through vehicle on-ramps, exit the roadway 109 through vehicle off-ramps, at-grade crossings, or merge onto different lanes. In some examples, the designer may decide not to overlap the fields of view of adjacent sensors 106 but rather, juxtapose the fields of view of adjacent sensors 106 to ensure the widest coverage of the roadway 109. In this manner, the system 100 can monitor and track more vehicles on the roadway 109 at a time.

In addition, each sensor can include memory and processing components for monitoring the objects on the roadway 109. For example, each sensor can include memory for storing data that identified and tracks the objects in the order the vehicles appear to a sensor. Similarly, each of the sensors 106 can include processing components for processing sensor data, identifying the objects in the sensor data, generating the data that identifies the tracked objects, and is later used to actually track the identified objects. The processing components can include, for example, video processing components, sensor-processing components, transmission components, and receive components and/or capabilities. Each of the sensors 106 can communicate with one another over network 110. The sensors 106 can also communicate with the central server 112 and with the gate system 107. The network 110 may include a Wi-Fi network, a cellular network, a Bluetooth network, C-V2X system, an Ethernet network, an Internet network, or some other communicative medium.

The sensors 106 can also communicate with a central server 112 over network 110. The central server 112 can include one or more servers connected locally or over a network. The central server 112 can also connect to one or more databases 114. These databases 114 can store information related to, for example, vehicles 108 traversing the dedicated roadway 109, trains 102 traversing the railroad 104, sensor data, and data related to the at-grade crossings. For example, the central server 112 can store data that represents the sensors 106 that are available to be used for monitoring the roadway 109. The data indicates which sensors 106 are active, which sensors 106 are inactive, a location of each sensor, the type of data recorded by each of the sensors 106, and data representing the fields of view of each of the sensors 106.

The central server 112 can store data identifying each of the sensors 106 such as, for example, IP addresses, MAC addresses, and preferred forms of communication to each particular sensor. The data can also indicate the relative positions of the sensors 106 in relation to each other. In this manner, a designer can access the data stored in the central server 112 to learn which sensors 106 are being used to monitor the roadway 109, pertinent information for each of these sensors 106, and debugging information related to each of these sensors 106.

The sensors 106 can also communicate with a gate system 107 over network 110. The gate system 107 can include a gate, communication devices, and an indicator. The gate system 107 is configured to enable vehicles access to an at-grade crossing on the roadway 109. The system 100 illustrates a single gate system 107 for the roadway 109, but the system 100 need not be so limited. For each at-grade crossing on the dedicated roadway 109 exists a gate system 107, maintaining vehicles' access to the at-grade crossing. In some implementations, the gate system 107 can receive sensor data from the sensors 106 on a periodic basis or another basis, e.g., when a road actor is detected, and in response, the gate system 107 can take various actions. In particular, the gate system 107 can determine from the sensor data that a vehicle from the roadway 109 is likely seeking to access the at-grade crossing. The gate system 107 can include a gate that blocks the vehicles' access to the at-grade crossing until one or more criteria have been met. The gate of the gate system 107 can be positioned between the roadway 109 and the at-grade crossing, shown in system 100.

In some implementations, the central server 112 may perform the processing for the gate system 107. For example, the central server 112 may perform each of the processing functions of the gate system 107 as described throughout the specification. The central server 112 can receive the sensor data from the sensors 106 and instruct the gate system 107 to take one or more actions. The one or more actions can include, for example, activating or opening the gate, maintaining the gate's closure, illuminating a particular indicator to a particular color that illustrates to the autonomous vehicle a status, and other actions, all based on the received sensor data. In some cases, one or more servers separate from the central server 112 can perform the functions of the gate system 1077, such as a cloud network or remote server.

In some implementations, the sensors 106 can include a trained machine-learning model that is configured to produce an indication that a detected autonomous vehicle will approach the at-grade crossing. The indication can be, for example, a statistical value, a percentage, a number, or a label, which indicates how likely this detected vehicle is to approach the at-grade crossing and seek to traverse the at-grade crossing. Once a sensor detects a vehicle in its field of view, the sensor can determine features and characteristics of the detected vehicle, and provide this information as input to the trained machine-learning model. This information can include, for example, a color of the detected vehicle, a class of the detected vehicle, a volume of the detected vehicle, a direction of the vehicle's movement, a velocity of the vehicle's movement, an acceleration of the vehicle's movement, and a path traveled by the vehicle on the roadway 109. As will be further described below, the trained machine-learning model can receive this information and observational information as input and produce an output that indicates how likely the detected vehicle is to approach the at-grade crossing.

The sensor can compare the output from the trained machine-learning model to a threshold value to enhance the accuracy of the trained machine-learning model's predictions. If the sensor determines that the likelihood output satisfies the threshold value, e.g., exceed or meets, then the sensor can transmit to the gate system 107 the following: (i) the input data provided to the trained machine-learning model, (ii) the likelihood indicating the detected vehicle is to approach the at-grade crossing, and (iii) data instructing the gate system 107 to take one or more actions. The gate system 107 can receive this information and take the instructed action when the detected vehicle approaches the gate.

During stage (A), the sensors 106 deployed along the roadway 109 can generate sensor data that represents autonomous vehicles 108 traversing the roadway 109. The sensors 106 can be deployed longitudinally along roadway 109, along both sides of the roadway 109, spaced a predetermined distance apart from one another, and positioned so that its field of view faces the roadway 109. Moreover, the sensors 106 can be configured to generate sensor data of road actors, e.g., objects in the roadway 109, autonomous vehicles 108 in the roadway 109, people walking in parallel to and perpendicular to roadway 109, and other objects.

The sensors 106 can obtain sensor data from areas of the roadway 109 and sensor data from the railroad 104. For example, the sensor data can include input video data, audio data, images, LIDAR data, radar data, and other data types. The data include recordings of sensor data from different locations on the roadway 109 as seen by the fields of view of each of the sensors 106, and can also include sensor data from different portions of the railroad 104.

In some implementations, the sensors 106 monitoring the roadway 109 can also monitor the railroad 104 and its corresponding activities. Specifically, the sensors 106 may include omni-directional capabilities that enable these sensors to obtain sensor data from each direction simultaneously, in a 360-degree fashion. In this manner, the sensors 106 can not only monitor autonomous vehicles traversing the roadway 109 and the corresponding at-grade crossings, but also one or more trains, e.g., train 102, traversing the railroad 104. Should an autonomous vehicle 108 accidentally cross onto the railroad 104 at a location other than an at-grade crossing, then the sensors 106 can notify the railroad system of the vehicle on the railroad 104. Similarly, should the train 102 fall off the railroad 104 onto the roadway 109, then the sensors 106 can notify the central server 112 and the autonomous vehicles 108 traversing the roadway 109 of actions to take to avoid the fallen train 102.

The roadway 109 can include various types of roads. For example, the types of roads can include exit ramps, entry ramps, general-purpose lanes, high occupancy vehicle (HOV) lanes, highways, back roads, side streets, median crossings, at-grade crossings, and other roads. The other roads can include different types of various capacity roads, larger roads, private roads, intersection roads, and other thoroughfares that sensors 106 displaced along these roadways can generate sensor data.

During stage (B), the sensors 106 can detect one or more road actors from the sensor data and the observational data in their field of view. The sensors 106 positioned along these roadways can generate sensor data as they detect road actors entering their field of view on the roadway 109. For example, the sensor data generated by each of the sensors 106 can include an identification of a vehicle type, identification of an object type, characteristics of detected vehicles, vehicular congestion, vehicle dynamics, vehicle density per unit area, vehicle travel path, to name some examples.

The observational data can include an environment in which these vehicles, objects, people are found, and how these items are current interacting with the environment. For example, the observational data can include a location of the one or more at-grade crossings on the roadway 109, a distance and a location of the at-grade crossing in relation to a location of the detected vehicle, and other data. Moreover, the observational data can describe velocity of other vehicles traversing the roadway 109, a movement direction of each of the other vehicles on the roadway 109, and one or more objects on the roadway 109 or the railroad 104 that may hinder traffic or railway traffic movement.

In some implementations, the sensors 106 deployed at each of these roadways can generate the sensor data at various intervals. For example, each time a sensor detects a vehicle in its field of view, the sensor can generate the sensor data. In response to generating the sensor data, the sensor 106-1 can transmit the generated sensor data to the next sensor in the longitudinal direction along the same roadway 109 to confirm that it also detects similar sensor data. The next sensor can pass its generated sensor data to the next sensor down the longitudinal line on the roadway 109 to ensure it sees similar vehicles, and so on. In this manner, the generated sensor data is highly accurate because each sensor on the roadway 109 can confirm the prior sensor's generated sensor data. In some examples, the sensors 106 can generate sensor data on a time basis, such as every 3 seconds. On the time basis, the sensors 106 may reduce their bandwidth and processing, but may also be less accurate in terms of identification and detection.

For example, sensor 106-1 can detect that autonomous vehicle 108-1 has entered its field of view. In response to detecting, the sensor 106-1 can record sensor data or media of a segment or portion of the roadway 109 and process the recorded sensor data using object detection or some other form of classification to detect the moving object. The object detection can seek to identify a vehicle, a person, an animal, or an object on the roadway 109. The object may be stationary or may be moving. In the example of system 100, the sensor 106-1 can detect and classify the autonomous vehicle 108-1 on the roadway 109. Similarly, the sensors 106-1 through 106-6 will have processed vehicle 108-N.

In some implementations, each of the sensors 106 can detect autonomous vehicle 108-1 by performing data aggregations of observations over a window of time. The data aggregations can improve the sensors' detectability of a vehicle in its field of view. The data aggregation can ensure that each sensor can identify and detect similar vehicles and their corresponding features.

The sensor 106-1 can then identify one or more features of the autonomous vehicle 108-1 detected in its field of view. These features can include observable properties of the vehicle, such as the vehicle color, e.g., as represented by red-green-blue (RGB) characteristics, the vehicle size, the vehicle class, and the volume of the vehicle, each of these calculated through optical characteristics. For example, the sensor 106-1 can determine that autonomous vehicle 108-1 is a white colored vehicle, is over 120 $ft^3$ in size, has a vehicle type of a semi-truck, and is a large sized vehicle. The sensor 106-1 may also determine one or more characteristics of the vehicle. The one or more characteristics of the vehicle can include, for examples, its velocity, its rate of speed or acceleration, its distance away from the sensor 106-1, its distance from a closest at-grade crossing, the autonomous vehicle 108-1's direction of travel, a prior path taken by the autonomous vehicle as gleaned through data received by sensor 106-1 from prior sensors, and a number of individuals found in the autonomous vehicle 108-1, to name some examples.

In some implementations, the types of components found at the particular sensor that detect the autonomous vehicle can determine the characteristics that describe the vehicle. For example, the sensor 106-1 may include a LIDAR system, a camera system, and a Wi-Fi system. The sensor 106-1 can then determine characteristics using the media recorded from the video camera and the point cloud recorded by the LIDAR system. For example, the sensor 106-1 can determine a color of the object, a size of the object, a distance from the object, a rate of movement of the object, and a direction of movement of the object. However, if the sensor 106-1 does not include a LIDAR system, the sensor 106-1 can rely on other components to determine the distance from the object, rate of movement of the object, and a direction of the object, to name some examples. For example, the sensor 106-1 may be able to utilize an external classifier to produce these results. The external classifier may be stored at the sensor 106-1 (and each of the sensors) or stored at a location accessible to the sensor 106-1 over network 110, e.g., such as the central server 112. Thus, the system 100 can benefit from having a combination of components to improve the detection process found at each of the sensors.

In some implementations, the sensor 106-1 can generate other feature data on the sensor data using sensor fusion. For example, in the case where sensor 106-1 utilizes multiple components, e.g., LIDAR system, radar system, and a video camera system, the sensor 106-1 can combine the observation from each of these components and assign these observations to a point in space. The point in space can represent an N-dimensional value that describes the feature. Then, the sensor 106-1 can use features to calculate and classify that particular point in space. For example, the sensor 106-3 can enjoin data from the radar system, the LIDAR system, and the camera system. The LIDAR system can generate a 1 point per centimeter for 200 meter-range for viewing the roadway 109, for example. The radar system can perform calculations that estimate where the vehicle or object is located in relation to the radar system. The video camera can estimate a volumetric projection of the identified object or vehicle based on a volumetric projection estimation algorithm. The sensor 106-1 can then calculate an identity product, e.g., the feature data, using the observations from each of these sensors, which can correspond to a hash of the observations. For example, the sensor 106-1 can calculate an identity product of the feature data and a timestamp the features were identified, from data provided by each of the sensors.

Then, the sensor 106-1 can transmit data representing the identity product of the feature data to the next sensor in the direction of traffic, e.g., sensor 106-2. The sensor 106-1 may transmit the data representing the identity product of the feature data when autonomous vehicle 108-1 has exited sensor 106-1's field of view. The data representing the identity product of the feature data include, for example, a data structure, a matrix, or a link to data stored in an external database. The sensor 106-1 can determine which sensor is the next sensor in a longitudinal line along the roadway 109. In some implementations, the sensor 106-1 may determine the next sensor by checking an order of the sensors. In some implementations, the sensor 106-1 may request from the central server 112 to indicate which sensor is the next sensor to receive the data. In response to receiving an indication from the central server 112 indicating which sensor is next to receive the data, e.g., sensor 106-2, the sensor 106-1 can transmit the data representing the identity product of the feature data to sensor 106-2 over network 110.

The sensor 106-2 can receive the identity product of the feature data from the sensor 106-1. The sensor 106-2 can generate feature data when it detects autonomous vehicle 108-1 in its field of view. In response to generating the feature data, the sensor 106-2 can compare the generated feature data with the received feature data from sensor 106-1. If the comparison results in a match or a near match within a threshold value, then the sensor 106-2 can determine that it is viewing the same autonomous vehicle 108-1 as seen by the sensor 106-1. In some examples, sensor 106-2 may transmit a confirmation back to sensor 106-1 indicating that it saw the same vehicle. Then, when autonomous vehicle 108-1 exits the field of view of sensor 106-2, the sensor 106-2 can transmit the generated feature data to the next sensor down the roadway 109, e.g., sensor 106-3. Each sensor within system 100, e.g., sensors 106-1 through 106-N, can perform a similar process when a vehicle is detected in its field of view.

In some implementations, the sensor can transmit their respective sensor data to the central server 112 each time a new object is detected. In some examples, the sensors 106 can transmit their respective sensor data when a sensor receives confirmation from the next sensor down the longitudinal line of sensors. The generated sensor data can not only include data regarding detected objects, but data identifying the sensors. The data identifying the sensors can include, for example, a type of sensor, the data generated by the sensor, IP addresses of the sensor, MAC addresses of the sensor, and other information to name some examples.

The central server 112 can receive the sensor data from each of the sensors 106. In some examples, the central server 112 can access one or more databases 114 to retrieve the generated sensor data from each of the sensors. In response, the central server 112 can generate vehicular characteristics of a detected vehicle from the generated sensor data. The vehicular characteristics can include, for example, prevailing speeds of the vehicles, vehicle dynamics, sensor visibility, object identification and train characteristics.

For example, the prevailing speeds of the vehicles along the roadway 109 can correspond to the speed at which 85 percent of the vehicles are traveling at or below that speed. The central server 112 can use the calculated prevailing speed as a reference for the speeds at which the autonomous vehicles 108 should travel along the roadway 109. The central server 112 can determine vehicle dynamics of autonomous vehicles 108 currently traversing the roadway 109. The vehicle dynamics can include vehicle acceleration, vehicle speed, and vehicle deceleration. Moreover, the central server 112 can determine sensor visibility, and determine whether the sensors can accurately see the road actors on the roadway 109. The central server 112 can determine from the sensor visibility whether a sensor is too close to another sensor, as the sensors share overlapping fields of view, and whether the sensors are too close or too far from the roadway 109. In response to generating this information, the central server 112 can aid the sensors monitoring the roadway 109 in determining actions for the gate system 107 to take. For example, based on current detected speeds of vehicles and identification of trains in the sensors data, the central server 112 can instruct the gate system 107 to open its gate or maintain closure of its gate.

During stage (C), the sensors 106 can provide the sensor data, the vehicle characteristics, and the observational data as input to the one or more trained machine-learning models. For example, the one or more trained-machine-learning models can receive as input: video, audio, images, LIDAR data, radar data, current vehicle characteristics information, prior vehicle path, and other data types. The other data types can be in the form of image files, binary files, and other data file types. The one or more trained machine-learning models can process the received inputs through each of the nodes in the models. The one or more trained machine-learning models can receive inputs and generate outputs on a continuous basis or each time the sensors obtain new input data.

In some implementations, the sensors 106 can monitor the path of traversal of each autonomous vehicle on the roadway 109. For example, as the autonomous vehicle 108-1 traverses the roadway 109 and enters and subsequently exits the fields of view of sensors 106-1, 106-2, and 106-3, these specific sensors can identify the autonomous vehicle 108-1 and detect its movement. When a sensor, such as sensor 106-1 detects vehicle 108-1 and generates a corresponding identity product, the corresponding identity product can include characteristic features of the vehicle as well as dynamics of the vehicle. One of the dynamics of the vehicle can include a distance the vehicle is from the sensor. In some examples, if sensor 106-1 determines that vehicle 108-1 is 20 feet away, sensor 106-2 determines that the vehicle 108-1 is 15 feet away, and sensor 106-3 determines that the vehicle 108-1 is 12 feet away, then the sensor 106-3 can likely determine that the vehicle 108-1 has traveled over a long left turn on roadway 109 toward the gate system 107. In some examples, if sensor 106-1 determines that vehicle 108-1 is 20 feet away, sensor 106-2 determines that the vehicle 108-1 is 22 feet away, and sensor 106-3 determines that the vehicle 108-1 is 24 feet away, then the sensor 106-3 can likely determine that the vehicle 108-1 has traveled over a long right turn on roadway 109 away from the gate system 107. Generally, the sensor 106-3 can provide data indicative of this path taken by the vehicle 108-1, e.g., path drawn by distances between the vehicle and subsequent sensors, to the trained machine-learning model.

The trained machine-learning model at the sensor, e.g., sensor 106-3, can analyze this path of detected vehicle 108-1 along with other characteristics of the vehicle 108-1 and characteristics of the environment, e.g., roadway 109 and the railroad 104, to produce an indication or likelihood indicating how likely the detected vehicle is to approach the at-grade crossing.

The one or more trained machine-learning models can output one or more likelihoods that indicate how likely the detected vehicle is to approach the at-grade crossing. In some examples, as illustrated in system 100, the one or more trained machine-learning models can output a likelihood decision of 75% that the detected vehicle 108-4 is to approach the at-grade crossing. In some examples, as illustrated in system 100, the one or more trained machine-learning models can output multiple likelihoods of decision, such as 75% and 25% that both indicate how likely the detected vehicle 108-4 is to approach the at-grade crossing. In the event that multiple likelihoods are output, the sensor 106-3 can select the lowest likelihood output to ensure a more accurate detection because selecting a higher likelihood when a lower likelihood is available may incur risk. In some examples, the sensor 106-3 can select the higher likelihood to ensure the gate system 107 can be prepared to activate depending on the detected vehicle approaching the at-grade crossing.

During stage (D), the sensor 106-3 can then identify a threshold value for comparing the determined likelihood. Specifically, the sensor 106-3 can select a threshold value, e.g., 65%, and compare the threshold value to the determined likelihood output by the one or more trained machine-learning models. If the sensor 106-3 determines that the output likelihood satisfies the threshold value, e.g., exceeds or meets the threshold value, then the sensor 106-3 can notify the gate system 107 to activate or open it gates. Alternatively, if the sensor 106-3 determines that the output likelihood does not satisfy the threshold value, e.g., falls below the threshold value, then the sensor 106-3 can determine it is unlikely that the detected vehicle will approach the gate system 107.

During stage (E), the sensor 106-3 that detected the vehicle, obtained the likelihood that the detected vehicle will approach the at-grade crossing, and compared the likelihood to the threshold value, can generate instructions to provide to the gate system 107. The instructions can include the inputs provided to the trained machine-learning model. For example, the inputs can include recorded sensor data from the sensor 106-3 and the determined characteristics of the detected vehicle. Moreover, the instructions can include data that instructs the gate system 107 how to activate. For example, the data that instructs the gate system 107 how to act can include whether to open a gate, whether to keep the gate closed, a period of time to keep the gate open, a period of time to keep the gate closed, a period of time to keep the gate closed prior to opening the gate, and other instructions.

In some examples, the other criteria can indicate that the gate system 107 not open the gate unless the detected vehicle be traveling at a particular speed. The sensor 106-3 may determine that the detected vehicle should only have access to the at-grade crossing once a particular speed is met because there is a train traveling down the railroad 104. In order for the system 100 to ensure the autonomous vehicle's safe passage through the at-grade crossing, the sensors 106 can ensure the vehicle is traveling at a desired speed through the at-grade crossing to (i) reduce the detected vehicle's time through the at-grade crossing and (ii) prevent any potential accidents between the traversing vehicle and the oncoming train. As will be further described in FIG. 1C, the sensors 106 can transmit a notification to the gate system 107 to activate or open as soon as the detected vehicle reaches the desired speed.

In some examples, the other criteria can indicate that the gate system 107 not open the gate unless a platooning of autonomous vehicles has occurred. Generally, the system 100 can seek to reduce the amount of times the gate system opens or reduce the amount of times a vehicle crosses at the at-grade crossings to prevent any potential railroad disruptions. In some examples, a platooning size can be dictated by the number of times the gate has previously opened that day. For example, if the gate of gate system 107 has opened a greater number of times, then the sensors can set a platooning amount to a high number, e.g., 10, to reduce the amount of times the gate has to open for future vehicles. If the gate of the gate system 107 has opened a small number of times, e.g., 2 times, then the sensors can set a platooning amount to a low number, e.g., 3, because the gate has opened infrequently and the likelihood of potential railroad disruption is low. As the number of gate openings increase throughout the day or some other time, then the sensors 106 can increase the size of the platooning amount. As will be further described in FIG. 1B, the sensors 106 can transmit a notification to the gate system 107 to activate or open as soon as a platooning size at the gate reaches the desired size.

In some example, the other criteria can indicate that the gate system 107 not open until one or more trains has passed. The sensors 106 can ensure the safety of the autonomous vehicles 108 seeking to cross the at-grade crossing by preventing them from accessing the at-grade crossing in response to detecting one or more trains on the railroad. The sensors 106 may detect one or more trains on the railroad via the interface system, identifying one or more trains traveling on the railroad through sensor data, and other data, to name some examples. Once the sensors detect the trains passing the at-grade crossing, the sensors 106 can enable the autonomous vehicles 108 to cross the at-grade crossing by instructing the gate system 107 to open.

During stage (F), the sensor 106-3 can transmit the generated instructions 118 over network 110 to the gate system 107. The gate system 107 can determine whether to activate the gate or maintain a closed gate based on the generated instructions 118. In some examples, the sensor 106-3 can transmit a notification to the detected vehicle, e.g., vehicle 108-4, to take a particular action, such as to reduce speed, increase speed, wait for a predetermined period of time, deny access to the at-grade crossing, or activate platoon mode. Other examples are also possible.

In some implementations, when the autonomous vehicle 108-4 traverses the at-grade crossing after being allowed access by the gate system 107, the autonomous vehicle 108-4 may be charged a toll. The toll can charge a customer or owner of the autonomous vehicle 108-4 for utilizing the at-grade crossing. In some examples, the toll can be charged in addition to or alternatively to the at-grade crossing upon entering the roadway 109. The toll can include, for example, a radio frequency ID reader, toll plazas, tollbooths, tollhouses, toll stations, toll bars, toll barriers, or tollgates, to name a few examples. Some tolls can be automatically charged and some tolls can be manually charged. In the case of autonomous vehicles, tolls can charge the autonomous vehicles with electronic toll collection equipment which can automatically communicate with the autonomous vehicle's transponder or use automatic vehicle plate recognition to charge the vehicles by debiting corresponding accounts. The charged toll can be used to generate revenue operator without materially adversely impacting the existing rail business. In some examples, the charged toll may be at a higher operating margin than what the railroad operator typically charges for railroad operation. In some examples, the charged toll may cost a similar amount to what the railroad operator typically charges for railroad operation.

In some implementations, each of the sensors 106 can perform the processes of stages (C) through (F) when a vehicle is detected in their field of view. In response to detecting a vehicle in their field of view, a sensor can determine the likelihood that the detected vehicle will approach the at-grade crossing, compare the likelihood to a threshold value, generate instructions for the gate system 107 and/or the detected vehicle, and transmit the generated instructions accordingly. For example, sensor 106-1 may detect vehicle 108-1 and perform the processes of stages (A) through (F). Subsequently, when sensor 106-2 detects vehicle 108-1, sensor 106-2 performs processes of stages (A) through (F). Conflict resolution may be required when one sensor, e.g., sensor 106-1, determines a likelihood that the detected vehicle 108-1 will approach the at-grade crossing and a subsequent sensor, e.g., sensor 106-2, determines a likelihood that the detected vehicle 108-1 will not approach the at-grade crossing.

Here, the gate system 107 can perform conflict resolution by relying on the latest instructions. Specifically, the gate system 107 can use the most up-to-date instructions from a sensor that most recently analyzed the detected vehicle. For example, sensor 106-1 may transmit instructions to the gate system 107 that indicates that the detected vehicle 108-1 will approach the gate system 107 or the at-grade crossing. Once received, the gate system 107 can take action based on the instructions or wait to receive additional instructions from the sensor regarding activating its gate. However, should the same sensor or another sensor, e.g., sensor 106-2, later transmit a notification indicating that the detected vehicle is not likely to approach the at-grade crossing, then the gate system 107 can use this notification for further processing. Now, the gate system 107 is aware that the detected vehicle 108-1 is no longer approaching the at-grade crossing. In this instance, the gate system 107 resolves any conflict disputes by the sensors when one or more sensors send conflicting instructions to the gate system 107.

In some implementations, the sensors 106 can monitor the path traversal of the detected vehicle on the roadway 109 and through the at-grade crossing. For example, as the detected vehicle 108-4 traverses the roadway 109 and approaches the gate system 107 to access the at-grade crossing, the sensors 106-3, 106-4, 106-5, and potentially 106-6 can identify the detected autonomous vehicle 108-4 and monitor its movement. However, after sensor 106-3 detects the autonomous vehicle 108-4 entering and exiting its field of view, the sensor 106-3 can transmit its identity product of feature to sensors 106-4, 106-5, and 106-6. The sensors 106 can transmit the identity product of feature data to multiple sensors when the roadway 109 splits in different directions. By transmitting the identity product of feature data to multiple sensors when the roadway 109 splits, e.g., sensors 106-4, 106-5, and 106-6, the sensors 106 can continuously monitor the traversal path of the autonomous vehicle 108-4's movement.

For example, if the sensor 106-3 determines the detected vehicle 108-4 entered its field of view and determines that the identity product of feature data received from the sensor 106-2 matches to the feature data generated by sensor 106-2, then the sensor 106-3 can determine that the autonomous vehicle 108-4 seen by sensor 106-2 is the same vehicle seen by sensor 106-3, and that the autonomous vehicle 108-4 is traversing down the roadway 109 in a longitudinal direction. In some examples, if the sensor 106-4 determines a vehicle entered its field of view and determines that the identity product of feature data received from sensor 106-3 matches to the identity product of feature data generated by sensor 106-4, then the sensor 106-4 can determine that the autonomous vehicle 108-4 is the same vehicle seen by sensor 106-3, and the sensor 106-4 can determine that the autonomous vehicle 108-4 has traversed the at-grade crossing. However, in some examples, if the sensor 106-4 determines that it is seeing a different vehicle than that seen by sensor 106-3, and sensor 106-6 determines that it is seeing the same vehicle as the vehicle seen by 106-3, then the sensor 106-6 can determine that the detected vehicle 108-4 is traversing down the roadway 109 and did not travel through the at-grade crossing.

In some implementations, the sensors can transmit their generated identity product to other sensors. For example, when sensor 106-2 detects vehicle 108-4 and generates the corresponding feature identity product, the sensor 106-2 can transmit the feature identity product forward, e.g., to sensor 106-3, and backwards, e.g., to sensor 106-4. Each sensor can transmit their generated feature identity product backwards for confirmation that they see the same detected vehicle as the prior sensor. In some examples, each sensor can transmit their generated identity product one sensor forward and one sensor backwards. In some examples, each sensor can transmit their generated identity product to all the sensors. In some examples, in the event that the roadway 109 splits, a sensor can transmit their generated feature identity product to various sensors in a manner that ensures a field of view coverage for each potential path a vehicle can take depending on how the roadway 109 splits.

Continuing with the example from above, if the sensor 106-3 receives a notification from sensor 106-4 indicating that the detected vehicle 108-4 traversed the at-grade crossing and the sensor 106-3 predicted the likelihood that the detected autonomous vehicle 108-4 will approach the at-grade crossing, then the sensor 106-3 can confirm its prediction was accurate. However, if sensor 106-3 receives the generated feature product from sensor 106-6 indicating that the detected vehicle 108-4 continues traversing along the roadway 109 and the sensors 106-3 originally predicted the likelihood that the detected autonomous vehicle 108-4 will approach the at-grade crossing, then the sensor 106-3 can confirm that its predication was inaccurate. In the latter example, the sensor 106-3 can provide feedback to the central server 112 over the network 110 to be used for feedback and updating of the trained machine-learning model. The feedback can include, for example, the inputs used by the sensor 106-3 to predict the vehicle is likely to approach the at-grade crossing, the output produced by the trained machine-learning model, the generated feature data received from the sensor 106-6, and other data. The central server 112 can receive the feedback data, retrained the trained machine-learning model, and push the re-trained machine-learning model to each of the sensors 106. The sensors 106 can discard their previous model and rely on the new re-trained machine-learning model received from the central server 112 for future predictions.

In some implementations, the central server 112 can store one or more data components and data types of system 100. Specifically, the central server 112 can store the one or more trained machine-learning models housed by the sensors 106 and the different versions of the one or more trained machine-learning models. The central server 112 can store data used to train the machine-learning models in the databases 114. Moreover, the central server 112 can receive requests from the sensors 106 for retraining the trained machine-learning models, can retrain the trained machine-learning models, and can deploy newly trained machine-learning models to each of the sensors 106.

For example, the databases 114 can store data relating to the autonomous vehicles 108 that traverse the roadway 109. The data can be stored in an indexed fashion, in which indexing information identifies a vehicle and associates the index information with data relating to the vehicle. For example, the indexing information can include an IP address, a MAC address, or another address related to a device onboard the vehicle that enables the sensors 106 and the central server 112 to communicate with each of the autonomous vehicles 108.

The data related to the vehicle can include the vehicle make, vehicle model, vehicle color, vehicle classification, data related to vehicle dynamics at different measured time instances while traversing the roadway, and can include historic information. The historic information can include, for example, a number of times the vehicle has accessed the roadway 109, a number of times the vehicle has accessed the at-grade crossing, and a number of times the vehicle has been detected by the sensors 106, to name some examples. Other detection information is also possible.

In some implementations, the central server 112 can also receive requests from one or more of the sensors 106 for notifying the authorities. One or more of the sensors 106 can detect a vehicle that is driving unsafely on the roadway 109, has crashed into the gate system 107, or is driving unsafely through the at-grade crossing. In response, the one or more of the sensors 106 can transmit a notification to the central server 112 indicating a detected autonomous vehicle is driving unsafely. The central server 112 can receive the notification and notify the proper authorities in response to try and prevent any further accidents or damage to the detected vehicle, to one or more trains 102 that may come in contact with the detected vehicle, or to other vehicles 108 traversing the roadway 109. In this example, the one or more sensors can provide sensor data illustrating the corresponding vehicle, the identity product of the feature data of the detected vehicle as determined by the corresponding sensor data, and other data that represents the detected vehicle traversing unsafely.

In some implementations, the central server 112 can also communicate with a database 114 that stores railroad data. The database 114 that stores railroad data can include data related to the activities of the train 102 and the railroad 104. For example, the activities can include a number of trips taken by the train 102 on railroad 104, actual start times for each trip, actual end times for each trip, planned start times for each trip, planned end times for each trip, future planned trips for the train 102 on railroad 104, profit received for operating the train 102 on railroad 104, contact information for an operator of the train 102, and data identifying a railroad system that manages the train 102 and the railroad 104, to name a few examples.

The data identifying the railroad system that manages the train 102 and the railroad 104 can include data identifying an interface that receives data from an external user or external system for managing the train 102 and the railroad 104. A client device, a computing device, or another device can provide the interface. A user, such as a train station manager, can provide data indicative of the train 102 and the railroad 104 to the interface. In some examples, the railroad system can be a computer system that can provide data indicative of the train 102, data indicative of the railroad 104, data indicative of past trips taken by trains on railroad 104, and data indicative of future trips on the railroad 104. Subsequently, the central server 112, one or more devices in system 100, the sensors 106, and the autonomous vehicles 108 can request for and access data provided the interface.

The data indicative of the train 102 and the railroad 104 that can be received by the interface and subsequently accessed by the various devices and components of system 100 can include, for example, a number of cars connected on train 102, a time for an upcoming trip of train 102, any mechanical issues or failures related to train 102, contact information for a train operator, or dynamic characteristics related to a current trip of train 102, e.g., train speed, acceleration, and a train's direction of travel, to name some examples.

Similarly, the devices and components of system 100 can transmit requests to the interface for information. For example, the sensors 106, the autonomous vehicles 108, and the central server 112 can each transmit a request to the interface for information related to the train 102 and the railroad 104. The request can include, for example, a predicted time when the train 102 is to reach a destination, e.g., a location proximate to one or more at-grade crossings or to an end destination, a current location of train 102, a direction of travel of train 102, a current speed of train 102, and additional status information related to train 102. The sensors 106, the autonomous vehicles 108, and the central server 112 can each receive responses from the interfaces. The responses can include information relevant to the request. For example, the sensors 106 can use the train information provided from the interface to make determinations about instructions to provide to the gate system 107 when determining whether to provide the autonomous vehicles with access to the at-grade crossings.

In some implementations, the central server 112 can also communicate with a database that stores information related to the roadway 109 and the corresponding sensors. For example, the information stored can include data identifying sensors that monitor the roadway 109, data identifying inactive sensors and active sensors that are positioned to monitor the roadway 109, and data identifying characteristics of the roadway 109. The data identifying the sensors monitoring the roadway 109 can include, for example, IP addresses, MAC addresses, and hostnames, as well as, the type of sensors included in each of the sensors 106. For example, sensor 106-1 can include a LIDAR system, a video camera, and a Wi-Fi system. The data identifying inactive and active sensors can be, for example, a notification indicating sensors 106-1, 106-3, 106-7, and 106-11 through 106-17 as active. Similarly, this data can indicate that sensor 106-N is inactive.

The data identifying characteristics of the roadway 109 can include, a number of lanes, a length of the roadway 109, a direction of travel for each lane, a frequency of use for the roadway 109, a location on the roadway for entrance and exit for each of the at-grade crossings, and data related to the toll charged amount for using the roadway 109 and each of the at-grade crossings. The data related to the toll charged amount can include, for example, a total amount of toll charged, a total amount of tolls received from the autonomous vehicles, a total amount of tolls not received from the autonomous vehicles, data identifying the transponders of the autonomous vehicles, and contact information related to the owner of the autonomous vehicles.

The central server 112 can use the data related to the toll charged stored in the database 114 to charge users that own the autonomous vehicles 108 that drive on the roadway 109, access the at-grade crossings, and do not pay upon entry. Specifically, the central server 112 can transmit a request for pay to the contact information of the owner for the charged toll amount plus a fee for not paying the toll upon entry of either the roadway 109 or the at-grade crossing. The central server 112 can receive the payment amount from the owner in response to transmitting the request to the owner, e.g., via cash, a check, a payment application, and payment through a web site, to name some examples. Similarly, the central server 112 can obtain payment information related to railroad 104 usage. The payment information can include an amount the railroad management system charges for a train 102 to use the railroad 104.

As such, the central server 112 can determine financial amounts related to tolls charged to vehicles and financial amounts related to trains traversal of railroad 104. The central server 112 can produce analytics that describe, for example, profits related to using both the roadway 109, the at-grade crossings, and the railroad 104, profits related to the individual usage of the roadway 109, the at-grade crossings, and the railroad 104, and profit margins related to the usage of the roadway 109, the at-grade crossings, and the railroad 104. Other examples are also possible.

Figure 1B:
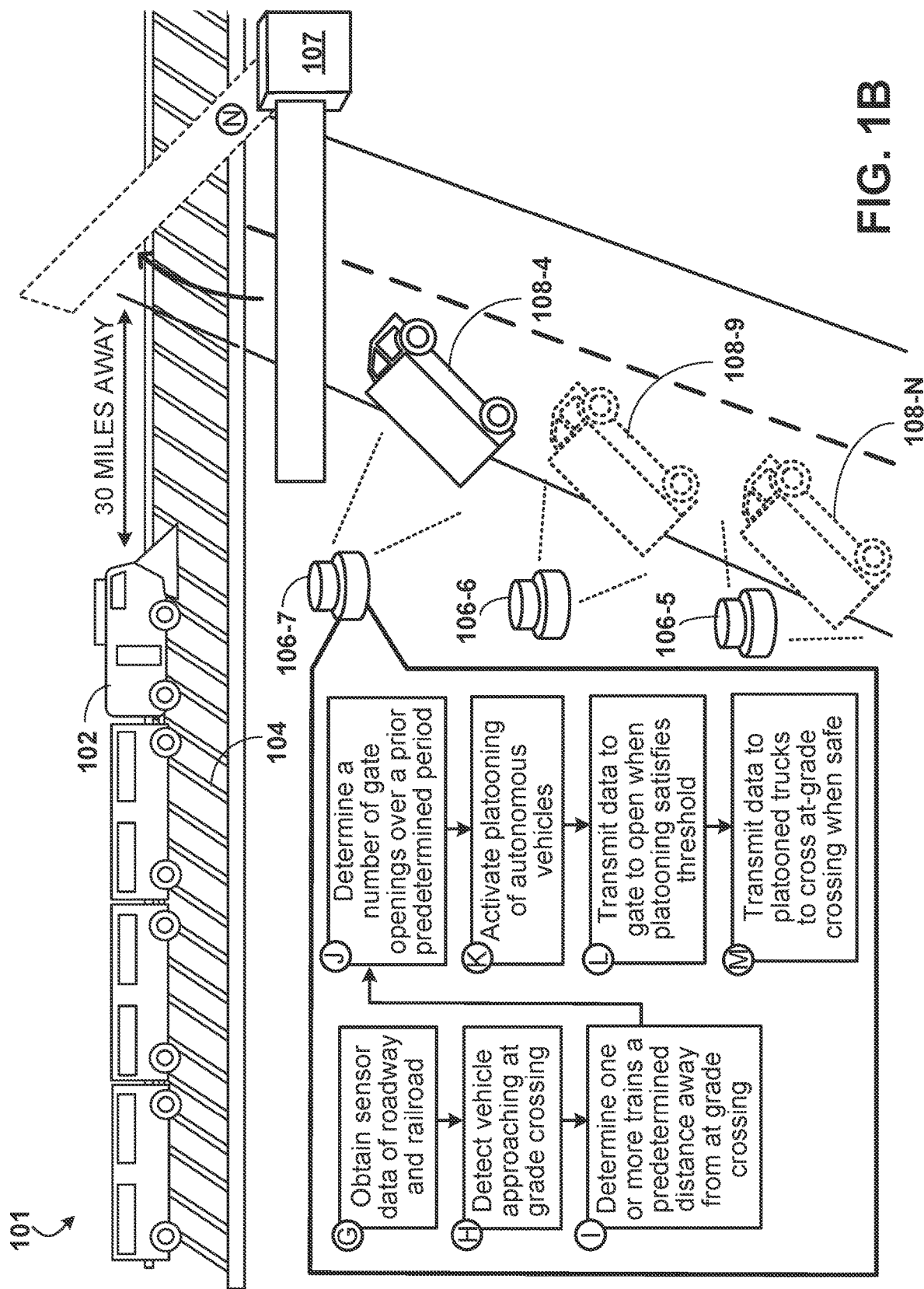
FIG. 1B is a block diagram that illustrates an example of a system for determining when to enable autonomous vehicles access to an at-grade crossing when platooning of autonomous vehicles satisfy criteria.

FIG. 1B is a block diagram that illustrates an example of a system 101 for determining when to enable autonomous vehicles access to an at-grade crossing when platooning of autonomous vehicles satisfy criteria. For example, the system 101 is a continuation of system 100. Thus, the functions described with respect to system 101 can also be performed in system 100, and vice versa. Specifically, the system 101 can illustrate a platooning of autonomous vehicles, e.g., vehicles 108-4, 108-9, and 108-N, when seeking to traverse the at-grade crossing. Moreover, the system 101 illustrates one or more sensors, e.g., sensors 106-5, 106-6, and 106-7, which monitor the platooned autonomous vehicles seeking to traverse the at-grade crossing. The monitoring can include detecting events on the roadway 109, detecting events on the railroad 104, detecting vehicles seeking to access the at-grade crossing, transmitting notification to other sensors 106, transmitting instructions to the gate system 107, and transmitting instructions to each vehicle of actions to take based on detected events, to name some examples. FIG. 1B illustrates various operations in stages (G) through (N), which can be performed in the sequence indicated, in another sequence, with additional stages, or fewer stages. The stages (G) through (N) can follow the stages of (A) through (F) of FIG. 1A.

During stage (G), the sensors 106-5 through 106-7 can monitor the roadway 109. In some implementations, the sensors 106-5 through 106-7 can monitor the roadway 109 and the railroad 104. The sensors 106 can include omni-directional capabilities, such that the sensors 106 can monitor both areas of the railroad 104 and the roadway 109. The sensors 106 can generate sensor data on a frame-by-frame basis based on their field of view. For example, the sensor data can include image data, video data, LIDAR data, radar data, audio data, and data recorded from other components included within the sensor, to name a few examples. Stage (G) is similar to stage (A) of FIG. 1A.

As illustrated in system 101, the sensor 106-7 can obtain sensor data of its environment. The sensor 106-7 can obtain sensor data of a portion of the roadway 109 proximate to the gate system 107 and a portion of the roadway 109. The sensor data can illustrate various events. The events can include, for example, a vehicle in the roadway 109, a train on the railroad 104, an object blocking the roadway 109 or the railroad 104, a status of the gate system 107, and other event types. The sensor 106-7 can also receive data of an event from other sensors, e.g., sensors 106-5 and 106-6. The data of an event can include, for example, generated identity product of feature of events seen by the other sensors.

During stage (H), the sensor 106-7 can detect one or more road actors from the obtained sensor data and the observational data in their field of the view. The sensor data generated by the sensor 106-7 can include, for example, an identification of a vehicle type, identification of an object type, characteristics of detected vehicles, vehicular congestion, vehicle dynamics, vehicle density per unit area, vehicle travel path, to name some examples. Moreover, from the sensor data, the sensor 106-7 can identify one or more features of the autonomous vehicle 108-4 in its field of view. The sensor 106-7 can also calculate an identity product using the obtained sensor data and observation data. Stage (H) of FIG. 1B is similar to stage (B) of FIG. 1A.

During stage (I), the sensor 106-7 can determine data related to train activities on the railroad 104. In some examples, the sensor 106-7 can transmit a request to the interface that manages the train 102 and the railroad 104. The sensor 106-7 can transmit the request to the interface to request for information that includes, for example, a current location of the train 102, a time for a current trip of the train 102, an indication of whether the train 102 is currently traveling, a current train speed, a current train acceleration, a train's direction of travel, and distance of the train to the at-grade crossing closest to the request sensor, to name a few examples. In essence, the sensor 106-7 can request this information to help identify whether it is possible for one or more autonomous vehicles to safely traverse through the at-grade crossing without causing train traffic disruptions.

The sensor 106-7 can receive a response from the interface over the network 110. For example, the response can include information that indicates the current train 102 is on a trip, traveling at a constant 60 MPH with no acceleration, traveling in an eastward direction towards the at-grade crossing, is currently located at the GPS coordinates of 41.718090461-70.6086892319, and is 30 miles away from the closest at-grade crossing. In some examples, the sensor 106-7 can also analyze the received sensor and observational data to determine whether the train 102 in its field of view or whether there is an obstacle on the railroad 104. The sensor 106-7 can analyze the received information from the interface and determine that ample amount of time and distance exists between the at-grade crossing and the location of the train 102 to allow one or more autonomous vehicles to traverse through the at-grade crossing.

In some implementations, the sensor 106-7 may determine that a minimum amount of time and distance exists between the at-grade crossing and autonomous vehicle 108-4. This minimum amount of time and distance may not be ample enough time to enable the autonomous vehicle 108-4 to navigate the at-grade crossing safely. In this instance, the sensor 106-7 may notify the gate system 107 to remain closed until a further instruction is received from the sensor 106-7 indicating safe passage through the at-grade crossing is possible. The sensor 106-7 may analyze its sensor data and observational data on a frame-by-frame basis to determine when it is safe for the autonomous vehicle 108-4 to traverse the at-grade crossing, such as after the train 102 passes through the at-grade crossing.

During stage (J), the sensor 106-7 may determine a number of gate openings over a prior predetermined period. The sensor 106-7 can transmit a request to the gate system 107 to determine how many times and for how long the gate system 107 has opened over a predetermined period. The predetermined period can include, for example, the last hour, the last 24 hours, the last week, and any other time period. The responses may include one time, five times, ten times, and any other number of times, for example.

Generally, the system 100 seeks to reduce the amount of times the gate system 107 opens. Each time the gate system 107, one or more autonomous vehicles 108 traverse the at-grade crossing. However, by enabling one or more autonomous vehicles 108 to traverse the at-grade crossing also incurs more risk, since a possibility exists for the autonomous vehicle to disrupt train traffic. For example, an autonomous vehicle may experience a mechanical issue while traversing the at-grade crossing and cease movement, which could create a collision with a train. In some examples, an autonomous vehicle may traverse the at-grade crossing based on incorrect or misguided decision making by the sensors 106. In this example, if the sensor 106-7 instructs the autonomous vehicle 108-4 to traverse the at-grade crossing when a train will intersect with the crossing autonomous vehicle 108-4, then a collision can occur. The sensors 106 can implement one or more actions to ensure the collisions and train traffic disruptions are avoided.

During stage (K), the sensor 106-7 can activate platooning of autonomous vehicles. In order to alleviate and prevent these situations from opening, the sensors 106 can activate platooning of the autonomous vehicles 108. In the platooning mode, a minimum number of vehicles is required to traverse the at-grade crossing at one time. The sensor 106-7 can wait until the minimum number of vehicles 108 that have approached the gate system 107 have been identified. In this instance, the vehicles 108 can line up behind one another and wait until the sensor 106-7 or other sensor provides access to the at-grade crossing.

In some examples, the sensor 106-7 can determine a platooning size based on the number of times the gate has previously opened in the predetermined time period. For example, if the sensor 106-7 determines that the gate system 107 has opened a large number of times in the past 24 hours, such as 12 times, then the sensor 106-7 can set the platooning size to a high number, such as 10. In this manner, the sensor 106-7 can ensure that the gate system 107 reduces the number of times it has to open in the future to minimize risk of potential train disruption or collision. Thus, when the sensor 106-7 determines that the platooning size in front of the gate system 107 has been met, e.g., the sensor 106-7 detects 10 autonomous vehicles positioned in line and ready to access the at-grade crossing, then the sensor 106-7 can instruct the gate system 107 to provide the 10 autonomous vehicles with access to the at-grade crossing.

In some examples, if the sensor 106-7 determines that the gate system 107 has opened a low number of times in the past 24 hours, such as 2 times, and then the sensor 106-7 can set the platooning size to a low number, such as 2 or even 1 vehicle. When the gate system 107 has opened a low number of times in the past 24 hours, the sensor 106-7 can infer a likelihood of potential railroad disruption is low because only a few autonomous vehicles have traversed the at-grade crossing. However, as the number of gate openings increases throughout the 24 hours or some other predetermined time period, then the sensors 106 can increase the size of the platooning amount. Thus, a direct relationship exists between the number of gate openings and a platoon size of autonomous vehicles.

In some implementations, the sensor 106-7 can compare the number of gate openings from the prior predetermined time period to a threshold value. If the number of gate openings from the prior predetermined time period satisfy the threshold value, e.g., meet or exceed, then the sensor 106-7 can set the platoon size to the high number, e.g., 10, for example. Alternatively, if the number of gate openings from the prior predetermined period does not satisfy the threshold value, e.g., falls below, then the sensor 106-7 can set the platoon size to the low number, e.g., 2, for example. Other examples of platoon size can also be set by the designer of the system.

In some implementations, when sensor 106-7 activates platooning mode, the sensor 106-7 transmits a notification to each other sensors monitoring the entrance of the gate system 107 to activate platooning mode. These sensors can include, for example, sensor 106-5 and 106-6. More or fewer sensors that monitor the entrance of the gate system 107 are also possible. These other sensors can receive the notification from the sensor 106-7 and activate the platooning mode.

In the platooning mode, these sensors, e.g., sensors 106-5, 106-6, and 106-7, work together to identify when the number of autonomous vehicles seeking to access the at-grade crossing meets or exceeds the desired amount. One sensor's field of view, e.g., sensor 106-7's field of view, may not be sufficiently large enough to view and identify all vehicles required for the platooning mode. As such, sensor 106-7 can incorporate a number of sensors required for the platooning mode based on its field of view. For example, if the sensor 106-7 determines it can view three unique vehicles in a line at one time and the platooning mode size is nine, then the sensor 106-7 can determine that two other sensors, e.g., sensors 106-6 and 106-5, are required to help sensor 106-7 identify when the platooning mode size has been met. Other examples are also possible. In this instance, the sensor 106-7 can transmit the notification to sensors 106-6 and 106-5 to activate the platooning mode.

In some implementations, the various platooning mode sensors can work together to identify the autonomous vehicles as they approach the gate system 107. Specifically, when one sensor detects a vehicle, that sensor can generate the identity product for that vehicle based on the observed sensor data and notify the other sensors of the generated identity product. When the subsequent sensor detects the vehicle, that sensor can confirm that it sees the same vehicle as the prior sensor using its own generated identity product or that it sees a new vehicle with a different generated identity product. These sensors can then add the matched identity product to a running list of identity products for the platooning vehicles.

Each sensor can produce an identity product for their detected vehicle and can compare their generated identity product to the other identity product generated by another sensor. If a sensor is the first to generate a unique identity product, then the sensors can add that unique identity product to the running list of identity products for the platooning vehicles. If another sensor generates an identity product that matches to the identity product on the list, then that sensor can confirm it is seeing the same vehicle. If a sensor creates an identity product that does not match to any other identity product generated by the other sensors, the sensors can add that unique identity product to the list.

In some implementations, the sensors can pass the list to each other each time a new identity product is added to the list. Once the size of the list satisfies the designated platooned size, e.g., the number of unique identity products matches to or exceeds the designated platooned size, then one or more of the sensors can determine that the platooned size has been met and these autonomous vehicles can now proceed to access the at-grade crossing. However, these sensors, e.g., sensors 106-5 through 106-7, can review the sensor data one final time before enabling the platooned vehicles access to the at-grade crossing. The reason for the additional check is because a certain amount of time may have passed from the time the activation of vehicle platooning initiated with the sensors to the time the designated platooned size was met. This can include, for example, 5 minutes, 10 minutes, 30 minutes, more time, or less time. Vehicles may have come and gone from the line and during this time period, the train 102 may have traveled a certain amount of distance on the railroad 104.

To ensure the safety of the platooned vehicles traversing the at-grade crossing now the platooned size has been met, the sensors can query the railroad interface to identify a current status of the train 102 or other trains on the railroad 104. The sensors can receive a response from the railroad interface that includes, for example, a time for an upcoming trip of train 102, any mechanical issues or failures related to train 102, or dynamic characteristics related to a current trip of train 102, e.g., train speed, acceleration, and a train's direction of travel, to name some examples. If the sensors determine that the train is sufficiently far enough away from the at-grade crossing, and more specifically, that the sensors determine any train 102 on the railroad 104 will not intercept or collide with the platooned vehicles during their traversal across the at-grade crossing, then the sensors can allow the platooned vehicles to traverse the at-grade crossing. Alternatively, if the sensors determine that a likelihood exists that the platooned vehicles may intersect or collide with an oncoming train during their traversal of the at-grade crossing, then the sensors can wait until the train has traveled past the at-grade crossing before allowing the platooned vehicles to traverse the at-grade crossing.

During stage (L), the sensor 106-7 can transmit data to the gate system 107 to open when the platooning satisfies a threshold value. In some implementations, the sensor 106-7 can transmit data to the gate system 107 to open the gate when the platooning size satisfies the threshold value and the one or more trains onboard the railroad system do not cause potential disruptions to or collisions with the platooned vehicles. In some examples, the sensors 106-7 can transmit an instruction to the gate system 107 to open the gate now. In some examples, the instruction can indicate for the gate to open, a period of time for the gate to remain open, a time at which the gate should open and/or the period of time for the gate to remain open, and a time at which the gate should close after opening, to name a few. The sensors 106-7 can transmit the instruction over the network 110 to the gate system 107. In response, the gate system 107 can open the gate and/or close the gate according to the received instructions. In some examples, the gate system 107 can also activate a color of its indicator to indicate to the vehicles that it is safe to proceed across the at-grade crossing. The color of its indicator may change from red, e.g., indicating not proceed, to green, e.g., indicating to proceed.

During stage (M), the sensor 106-7 can transmit data to the platooned autonomous vehicle to traverse the at-grade crossing when deemed safe. In response to transmitting the instructions to the gate system 107 to open, then the sensor 106-7 can transmit a notification to each vehicle in the platooned vehicles indicating that they can safely access the at-grade crossing once the gate of the gate system 107 opens. The onboard sensor processing system of each platooned vehicle can receive the notification and instruct the navigation system of the corresponding vehicle to proceed along its intended route. The intended route can include, for example, a route that traverses through the at-grade crossing over the railroad 104.

During stage (N), the gate of the gate system 107 opens. In response, each platooned vehicle can safely travel across the at-grade crossing over the railroad 104. After the platooned vehicles have safely and successfully passed over the at-grade crossing, the gate system 107 can close its gate. For example, a sensor on the other side of the at-grade crossing, e.g., sensor 106-9, can receive the list of platooned vehicles from one of the platooned sensors, e.g., sensors 106-7, 106-6, and 106-5. As each vehicle of the platooned vehicles traverses through the at-grade crossing, the sensor 106-9 can determine from its sensor data whether it (i) detects a vehicle and (ii) generates an identity product of the detected vehicle that matches to an identity product in the list of platooned vehicles. Once the sensor 106-9 determines that it has matched to each identity product in the list of platooned vehicles, the sensor 106-9 may transmit a notification to the gate system 107 to close the gate. In some examples, the sensor closest to the gate system 107, such as sensor 106-7 can transmit a notification to the gate system 107 to close the gate once it no longer views a detected vehicle from the platooned vehicles in its field of view.

Figure 1C:
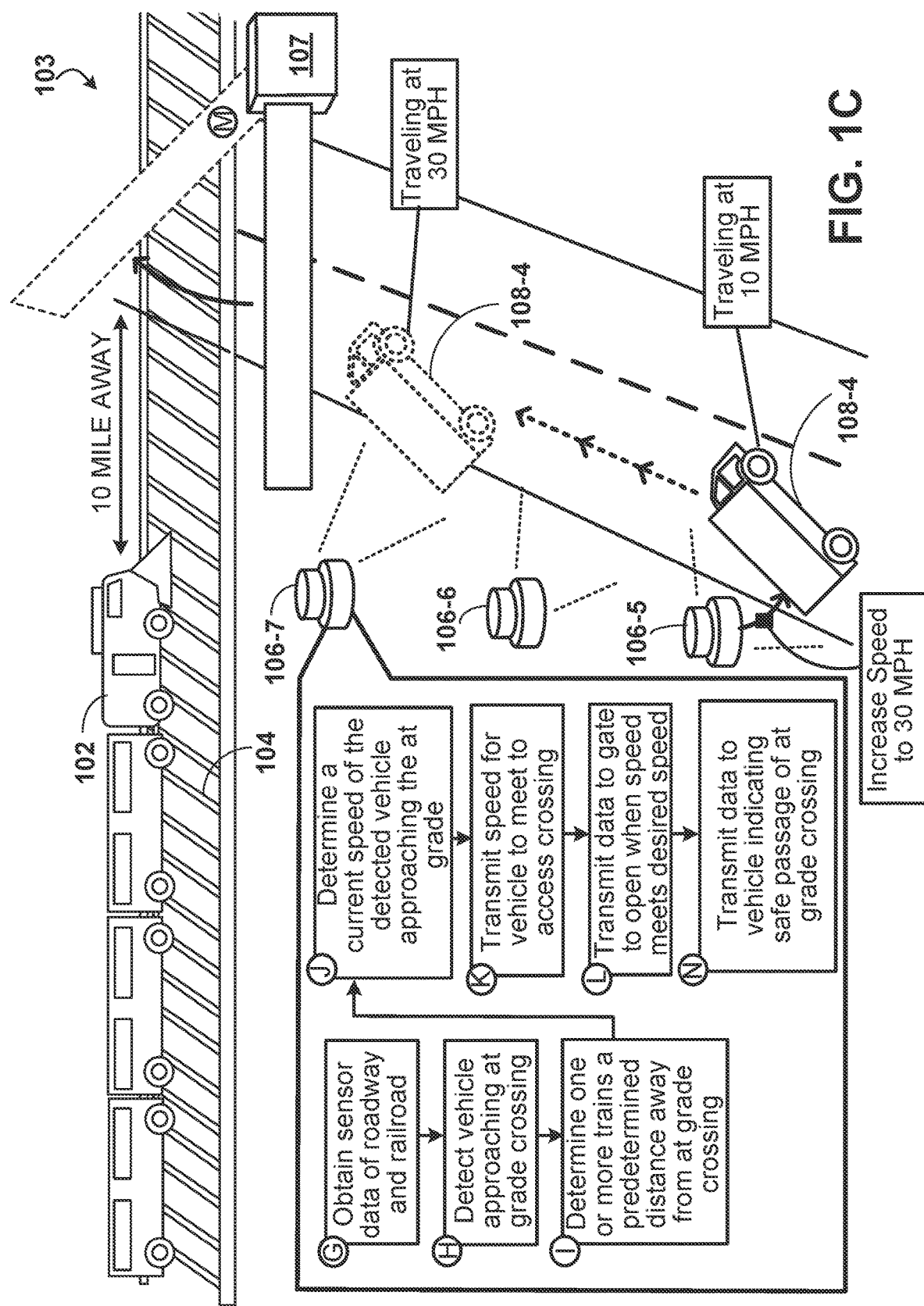
FIG. 1C is a block diagram that illustrates an example of a system for determining when to enable autonomous vehicles access to an at-grade crossing when dynamics of the autonomous vehicles satisfy criteria.

FIG. 1C is a block diagram that illustrates an example of a system 103 for determining when to enable autonomous vehicles access to an at-grade crossing when dynamics of the autonomous vehicles satisfy criteria. For example, the system 103 is a continuation of system 100. Thus, the functions described with respect to system 103 can also be performed in system 100, and vice versa. Specifically, the system 103 can ensure an autonomous vehicle reaches a desired speed before allowing access to the at-grade crossing. Moreover, the system 103 illustrates one or more sensors, e.g., sensors 106-5, 106-6, and 106-7, which monitor the autonomous vehicle's speed who is seeking to traverse the at-grade crossing. The monitoring can include detecting events on the roadway 109, detecting events on the railroad 104, detecting vehicles seeking to access the at-grade crossing, transmitting notification to other sensors 106, transmitting instructions to the gate system 107, and transmitting instructions to each vehicle of actions to take based on detected events, to name some examples. FIG. 1C illustrates various operations in stages (G) through (N), which can be performed in the sequence indicated, in another sequence, with additional stages, or fewer stages. The stages (G) through (N) can follow the stages of (A) through (F) of FIG. 1A.

During stage (G), the sensors 106-5 through 106-7 can monitor the roadway 109 and the railroad 104, and obtain sensor data based on their observations. Stage (G) is similar to stage (G) of FIG. 1B.

During stage (H), the sensor 106-7 can detect one or more road actors from the obtained sensor data and the observational data in their field of the view. Stage (H) is similar to stage (H) of FIG. 1B.

During stage (I), the sensor 106-7 can determine data related to train activities on the railroad 104. Stage (I) is similar to stage (I) of FIG. 1B.

During stage (J), the sensor 106-7 can determine a current speed of the detected vehicle approaching the gate system 107. For example, the sensor 106-7 can analyze the obtained sensor data to determine a velocity of the detected vehicle. As shown in the example of system 103, the autonomous vehicle 108-4 is traveling at 10 miles per hour (MPH). The vehicle velocity can be determined as the velocity of the detected vehicle traversing the roadway towards the gate system 107. In some examples, the sensor 106-7 can determine that the detected vehicle should have access to the at-grade crossing once a particular speed is met because the sensor 106-7 determined that a train 102 is traveling down the railroad 104. In order for the system 103 to ensure the detected autonomous vehicle's safe passage through the at-grade crossing, the sensor 106-7 can determine that the detected vehicle is traveling at the desired speed through the at-grade crossing to (i) reduce the detected vehicle's time through the at-grade crossing and (ii) prevent any potential accidents between the detected vehicle and the oncoming train on the railroad 104. In some implementations, the sensor 106-7 can decide to wait and instruct the detected vehicle to cross the at-grade crossing after the oncoming train has passed the at-grade crossing.

During stage (K), the sensor 106-7 can determine a new speed for the detected vehicle to meet before gaining access to the at-grade crossing. The sensor 106-7 can analyze the characteristics relating to the train 102 and the characteristics related to the detected vehicle 108-4. The characteristics relating to the train 102 can include, for example, the speed at which the train 102 is traveling, the distance of the train 102 to the at-grade crossing, the direction at which the train 102 is traveling towards the at-grade crossing, and a time at which the train 102 is intended to cross the at-grade crossing. Moreover, the characteristics related to the detected vehicle 108-4 can include, for example, a current speed of the detected vehicle 108-4, a current location of the detected vehicle 108-4, a distance between the current location of the detected vehicle 108-4 and a location of the gate of gate system 107, and a type of the detected vehicle 108-4.

Specifically, the sensor 106-7 can determine a speed the detected vehicle needs to be traveling based on the speed of the train 102, the train 102's distance from the at-grade crossing, the detected vehicle 108-4's current speed, and the detected vehicle 108-4's current distance to the at-grade crossing. If the sensor 106-7 determines, for example, that the train 102 is traveling at 100 miles per hour and the train is 100 miles away, then the sensor 106-7 can determine that the detected vehicle 108-4 can maintain its current speed without many adjustments because the train 102 will not reach the at-grade crossing for at least one hour. In some examples, if the sensor 106-7 determines that the train 102 is traveling at 100 MPH and the train is 1 mile away, then the sensor 106-7 can determine that the detected vehicle 108-4 should wait until the train 102 passes the at-grade crossing to avoid a collision and avoid any train disruption.

In some examples, if the sensor 106-7 determines that the train 102 is traveling at 50 MPH and the train is 10 miles away, then the sensor 106-7 can determine that the detected vehicle 108-4 can safely navigate the at-grade crossing if a particular speed is reached. Continuing with this example, if the train 102 continues at the same velocity, then the train 102 will arrive at the at-grade crossing in 12 minutes. The sensor 106-7 can then analyze the current speed of the autonomous vehicle 108-4, e.g., 10 MPH and a distance between the autonomous vehicle 108-4's location to the gate of the gate system 107, and determine a speed the autonomous vehicle should meet to pass the at-grade crossing safely. For example, if the sensor 106-7 determines that the detected vehicle is 200 feet away from the gate of the gate system 107 and is currently traveling at 10 MPH, then the sensor system 106-7 can determine the vehicle should reach 30 MPH prior to reaching the gate to enable gate access. In some examples, the sensor 106-7 can also determine other speeds in order to ensure the safe passage of the detected vehicle 108-4 across the at-grade crossing.

The sensor 106-7 can transmit the newly determined speed to the detected autonomous vehicle 108-4. For example, the sensor 106-7 can transmit an indication that the detected autonomous vehicle 108-4 needs to increase its speed to a value of 30 MPH prior to reaching the gate system 107. The onboard sensor processing system of the autonomous vehicle 108-4 can receive the speed value of 30 MPH from the sensor 106-7 and instruct the components of the autonomous vehicle 108-4 to increase speed to 30 MPH.

In some examples, the sensor 106-7 can determine that the autonomous vehicle 108-4 is traveling too fast for accessing the at-grade crossing. The sensor 106-7 can make this determination if the sensor 106-7 determines the autonomous vehicle 108-4 will reach the gate prior to the gate's opening. In some examples, the sensor 106-7 can determine that the autonomous vehicle 108-4 is traveling too fast for accessing the at-grade crossing if the sensor 106-7 determines the velocity of the autonomous vehicle 108-4 exceeds a recommended speed for traveling the at-grade crossings. Other examples are also possible. In this instance, the sensor 106-7 can transmit the instruction to the onboard sensor processing system of the autonomous vehicle 108-4 to reduce their speed to a desired speed, e.g., 15 MPH, for example.

During stage (L), the sensor 106-7 can transmit data to the gate system 107 to open its gate when the vehicle speed meets the desired speed. The sensor 106-7 and the other sensors, e.g., sensors 106-5 and 106-6, can monitor the vehicle dynamics of the autonomous vehicle 108-4. These sensors can obtain sensor data on a frame-by-frame basis, monitoring both the roadway 109 for the speed of the autonomous vehicle 108-4 and the railroad 104 for the traveling train 102. Once one of the sensors determines that, the speed of the autonomous vehicle 108-4 meets or exceeds the desired speed, as indicated by the sensor 106-7, that sensor can transmit a notification to the gate system 107 to open the gate. The data transmit can include data similarly transmit to the gate system 107 during stage (L) of FIG. 1B.

During stage (M), the gate of the gate system 107 opens in response to receiving the instruction from the sensor 106-7.

During stage (N), the sensor 106-7 can transmit a notification to the autonomous vehicle 108-4 indicative of safe passage through the at-grade crossing. Once the gate of the gate system 107 has opened and the autonomous vehicle 108-4 has reached the designated velocity, the sensor 106-7 can notify the autonomous vehicle 108-4 of its allowed access to the at-grade crossing. In some implementations, if the autonomous vehicle 108-4 does not reach the desired speed instructed during stage (K) prior to reaching the gate, then the sensor 106-7 can transmit a notification to the autonomous vehicle 108-4 instructing it to stop at the gate. In this manner, the sensor 106-7 can ensure the autonomous vehicle 108-4 only crosses the at-grade crossing if the various criteria are satisfied. If the various criteria are not satisfied, the sensor 106-7 can instruct the autonomous vehicle 108-4 to cease their traversal and for the gate of gate system 107 to close until the train 102 has passed through the at-grade crossing.

Figure 2:
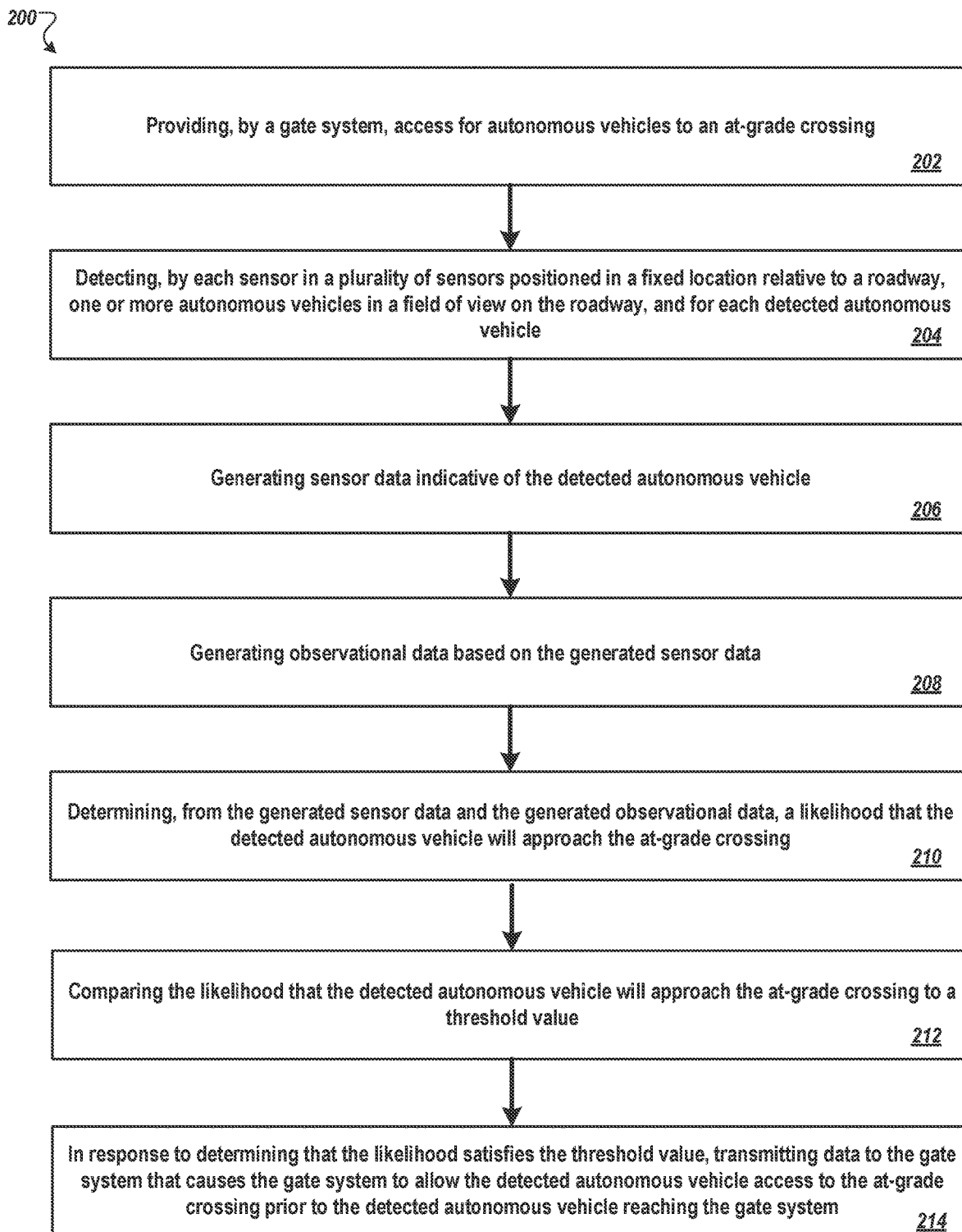
FIG. 2 is a flow diagram that illustrates an example of a process for monitoring autonomous vehicles traversing a dedicated roadway that includes an at-grade crossing.

FIG. 2 is a flow diagram that illustrates an example of a process 200 for monitoring autonomous vehicles traversing a dedicated roadway that includes an at-grade crossing. The sensors, such as sensors 106, a central server, and the gate system 107 may perform the process 200.

During (202), a gate system may provide access for autonomous vehicles to an at-grade crossing. The gate system can include a gate, communication devices, and an indicator. The gate system can enable vehicles access to an at-grade crossing on the roadway, according to instructions provided by the sensors and/or manual instruction. In some implementations, the gate system can receive sensor data from the sensors on a periodic basis or another basis, e.g., when a road actor is detected, and in response, the gate system can take various actions. In particular, the gate system can determine from the sensor data that a vehicle from the roadway is likely seeking to access the at-grade crossing. The gate system can include a gate that blocks the vehicles' access to the at-grade crossing until one or more criteria have been met. The gate of the gate system can be positioned between the roadway and the at-grade crossing. The one or more actions can include, for example, activating or opening the gate, maintaining the gate's closure, illuminating a particular indicator to a particular color that illustrates to the autonomous vehicle a status, and other actions, all based on the received sensor data.

Each sensor from a plurality of sensors is positioned in a fixed location relative to the roadway, and each sensor can communicate with a central server. Moreover, each sensor can detect one or more autonomous vehicles in a first field of view on the roadway (204). For example, the plurality of sensors can be positioned longitudinal to the direction of traffic on the roadway. The roadway can include, for example, a main roadway and a dedicated roadway. Each sensor can be placed in the ground at a predetermined distance apart from one another. Additionally, each sensor's field of view can be positioned towards a segment or area of the roadway to detect and monitor vehicles. Similarly, each sensor's field of view can be positioned to monitor characteristics of a railroad that runs in parallel to the dedicated roadway. For each detected vehicle, the sensors can perform the operations as described below. A sensor can detect a particular vehicle in its field of view. The sensor can use object detection or some form of classification to detect an object in its field of view.

During (206), each sensor can generate sensor data indicative of the detected autonomous vehicle. For example, the sensor data can include input video data, audio data, images, LIDAR data, radar data, and other data types. The data include recordings of sensor data from different locations on the roadway as seen by the fields of view of each of the sensors and can also include sensor data from different portions of the railroad. The sensor data can correspond to an identification of a vehicle type, characteristics of detected vehicle or vehicles, and vehicle dynamics, to name some examples. The identification of the vehicle type can correspond to, for example, a truck, a sedan, a minivan, a hatchback, an SVU, and others. The identification of the vehicle type can be based on a size of the vehicle. Characteristics of the vehicle can include, for example, vehicle color, vehicle size, wheelbase distance, and length, height, and width of vehicle. Vehicular density per unit area can correspond to a number of vehicles measured over a particular area in traffic. Vehicular congestion can correspond to a measure of an amount of traffic and movement rate of the traffic in a particular area. Vehicle headway can correspond to a distance between a first and second vehicle in a transit system measured in time or in distance. Vehicle dynamics can include acceleration, deceleration, and velocity of one or more vehicles traveling along the prior roadways over a period of time.

Each sensor can identify features of the vehicles it detects and can use the feature data to generate the sensor data. For example, each sensor can identify features of the detected vehicles that include, for example, the vehicle color, e.g., as represented by red-green-blue (RGB) characteristics, the vehicle size, e.g., as calculated through optical characteristics, the vehicle class, e.g., as calculated through optical characteristics, and the volume of the vehicle, as calculated through optical characteristics. In one such example, a sensor can determine that a detected vehicle is the color blue, is over 150 ft$^3$ in volume, has a vehicle type of a sedan, and is a medium sized vehicle. Other examples are also possible. The sensor can also determine one or more characteristics of the vehicle, such as its rate of speed, the distance away from the sensor, the vehicle's direction of travel, a prior path taken by the vehicle while traversing the roadway, and a number of individuals found in the vehicle, to name a few examples. Based on the generated feature data, the sensor can generate sensor data that includes an identification of a vehicle type, characteristics of detected vehicle or vehicles, vehicular density per unit area, vehicle congestion, vehicle headway, and vehicle dynamics, to name a few examples.

In some implementations, a sensor can query a railroad system for railroad specific information. The railroad system can include an interface system that receives and displays the railroad specific information. This information can include, for example, characteristics of a train currently traversing the roadway that traverses one or more at-grade crossings, characteristics of previous trains that have traversed the railroad, characteristics of trains that traversed the railroad that overlaps with the dedicated roadway, a number of railroads, and characteristics of the railroad, to name some examples. Each sensor can also query for train and railroad information from the interface system that communicates with the railroad system. In some implementations, the central server can query for train and railroad information from the interface system that communicates with the railroad system.

In some implementations, each sensor can monitor train activities on the railroad. These sensors may include, for example, omni-directional capability that enables viewing and obtaining sensor data from each direction simultaneously, in a 360-degree fashion. In this manner, the sensor can not only monitor autonomous vehicles entering, traversing, and exiting the dedicated roadway, but also, monitoring one or more trains traversing the railroad and one or more trains as they traverse the at-grade crossings. The sensors can monitor the sensor data of the railroad to aid the sensors in determining actions for the autonomous vehicles to take while traversing the dedicated roadway.

During (208), each sensor can generate observational data based on the generated sensor data. Specifically, each sensor can determine a location of the at-grade crossing on the roadway, can determine a distance and direction of the at-grade crossing in relation to a location of the detected vehicle, and can determine traffic characteristics on the roadway, the traffic characteristics including (i) velocity of other vehicles traversing the roadway, (ii) a movement direction for each vehicle of the other vehicles, and (iii) objects on the roadway that hinder traffic movement. Generally, the observational data can include data that describes events occurring on the dedicated roadway. These events can also include, for example, a fallen tree, an obstacle on the dedicated roadway, an icy portion of the dedicated roadway, a traffic jam, a vehicular accident, a train that has fallen on the dedicated roadway, or another type of event. The observational data can also indicate a location of the detected event on the dedicated roadway based on the generated sensor data. The observational data can be shared between sensors and shared between sensors and the central server.

In some implementations, a sensor can communicate the obtained sensor data and the observational data to each of the other various sensors. For example, when a sensor generates sensor data of the feature data, the sensor can generate an identity product of the feature data and can transmit data representing the identity product of the feature data when the corresponding detected vehicle has exited the sensor's field of view. The data representing the identity product of the feature data can include, for example, a data structure, a matrix, or a link to data stored in a database. For example, a sensor that generated sensor data can transmit the generated sensor data and observational data to the next sensor in the direction of traffic. The next sensor can receive the data representing the identity product of the feature data and can compare the data representing the identity product of the feature data to new feature data generated by the next sensor. The next sensor performs this comparison to determine whether it is seeing the same vehicle as seen by the previous sensor, e.g., the sensor that transmitted the data representing the identity product of the feature data to the next sensor. This process repeats as each sensor detects one or more vehicles in their fields of view.

During (210), each sensor can determine, from the generated sensor data and the generated observational data, a likelihood that the detected autonomous vehicle will approach the at-grade crossing. In some implementations, each of the sensors can include one or more trained machine-learning models. These sensors can provide the sensor data, the vehicle characteristics, and the observational data as input to the one or more trained machine-learning models. For example, the one or more trained-machine-learning models can receive as input: video, audio, images, LIDAR data, radar data, current vehicle characteristics information, prior vehicle path, and other data types. The other data types can be in the form of image files, binary files, and other data file types. The one or more trained machine-learning models can process the received inputs through each of the nodes in the models. The one or more trained machine-learning models can receive inputs and generate outputs on a continuous basis or each time the sensors obtain new input data.

Specifically, each sensor can provide (i) data indicative of the generated observational data, (ii) data indicative of the generated sensor data, and (iii) data identifying the detected vehicle using a trained machine-learning model, as input to a trained machine-learning model, the trained machine-learning model configured to produce the likelihood that the detected autonomous vehicle will approach the at-grade crossing. In response, each sensor can obtain, as output from the trained machine-learning model, the likelihood that the detected autonomous vehicle will approach the at-grade crossing prior to the detected autonomous vehicle approaching the at-grade crossing. For example, the trained machine-learning model at the sensor can analyze the input data to produce an indication or likelihood indicating how likely the detected vehicle is to approach the at-grade crossing.

In some examples, the one or more trained machine-learning models can output a likelihood decision of 95% that the detected vehicle is to approach the at-grade crossing. In some examples, the one or more trained machine-learning models can output multiple likelihoods of decision, such as 65% and 35% that both indicate how likely the detected vehicle is to approach the at-grade crossing. In the event that multiple likelihoods are output, the sensor can select the lowest likelihood output to ensure a more accurate detection because selecting a higher likelihood when a lower likelihood is available may incur risk. In some examples, the sensor can select the higher likelihood to ensure the gate system can be prepared to activate depending on the detected vehicle approaching the at-grade crossing. Other examples are also possible.

During (212), each sensor can compare the likelihood that the detected autonomous vehicle will approach the at-grade crossing to a threshold value. Specifically, each sensor can select a threshold value, e.g., 65%, and compare the threshold value to the determined likelihood output by the one or more trained machine-learning models. If the sensor determines that the output likelihood satisfies the threshold value, e.g., exceeds or meets the threshold value, then the sensor can notify the gate system to activate or open its gate. Alternatively, if the sensor determines that the output likelihood does not satisfy the threshold value, e.g., falls below the threshold value, then the sensor can determine it is unlikely that the detected vehicle will approach the gate system.

In some implementations, the sensors can analyze other criteria in determining whether to allow the autonomous vehicles access to the at-grade crossing. The sensors can determine whether one or more trains are traveling towards or away from the at-grade crossing, whether the vehicle is platooning with other vehicles prior to allowing their access to the at-grade crossing, whether the vehicle has reached a particular velocity prior to being allowed access to the at-grade crossing, and other criteria. Specifically, the sensors can acquire sensor data of one or more trains traversing a railroad prior to or after the at-grade crossing either through their field of view or through the interface system and determine characteristics of those trains. This can include, for example, a direction of the one or more trains traversing the railroad, a speed of the one or more trains, and a distance the one or more trains are from the at-grade crossing. In response, the sensor can determine whether to provide the detected autonomous vehicle access to the at-grade crossing prior to the one or more trains traversing the at-grade crossing based on the distance the one or more trains are from the at-grade crossing and the speed of the one or more trains.

Moreover, the sensors can determine whether to allow the vehicles access to the at-grade crossings when a platooning of vehicles has occurred. Generally, the system can seek to reduce the amount of times the gate system opens or reduce the amount of times a vehicle crosses at the at-grade crossings to prevent any potential railroad disruptions. In some examples, a platooning size can be dictated by the number of times the gate has previously opened that day. For example, if the gate of gate system has opened a greater number of times, then the sensors can set a platooning amount to a high number to reduce the amount of times the gate has to open for future vehicles. If the gate of the gate system has opened a small number of times, then the sensors can set a platooning amount to a low number because the gate has opened infrequently and the likelihood of potential railroad disruption is low. As the number of gate openings increase throughout the day or some other time, then the sensors can increase the size of the platooning amount. Thus, in response to determining the prior number of openings of the gate system over the prior predetermined time period satisfies a second threshold, e.g., 5 for example, the sensors can transmit data to the autonomous vehicle to activate platooning mode. In the platooning mode, the autonomous vehicle is instructed to wait to access the at-grade crossing until a predetermined number of autonomous vehicles have platooned with the detected autonomous vehicle.

In some implementations, the sensors can determine whether to open the gate system unless the detected vehicle is traveling at a particular speed. The sensor may determine that the detected vehicle should only have access to the at-grade crossing once a particular speed is met because there is a train traveling down the railroad towards the at-grade crossing. In order for the system to ensure the autonomous vehicle's safe passage through the at-grade crossing, the sensors can ensure the vehicle is traveling at a desired speed through the at-grade crossing to (i) reduce the detected vehicle's time through the at-grade crossing and (ii) prevent any potential accidents between the traversing vehicle and the oncoming train.

Thus, when determining to provide the detected autonomous vehicle access to the at-grade crossing, the sensors can determine a current speed of the detected vehicle and in response, determine that the detected speed is not sufficient to traverse the at-grade crossing prior to the one or more trains traversing the at-grade crossing. In response, the sensors can determine a new speed for the detected vehicle to traverse the at-grade crossing that is sufficient to avoid colliding with the one or more trains that are traveling towards the at-grade crossing. The sensors can transmit the new speed to the detected vehicle. Once these sensors determine that the new detected vehicle is traveling at the newly instructed speed, these sensors can instruct the gate system to allow these vehicles access to the at-grade crossing.

During (214), in response to determining that the likelihood satisfies the threshold value, each sensor can transmit data to the gate system that causes the gate system to allow the detected autonomous vehicle access to the at-grade crossing prior to the detected autonomous vehicle reaching the gate system. In some implementations, the sensors can generate instructions to transmit to the gate system that causes the gate system to activate or open, enabling the detected autonomous vehicle to traverse through the at-grade crossing. These sensors can generate the instructions if the likelihood satisfies the threshold and one or more of the other criteria have also been satisfied.

In some implementations, the sensors can transmit instructions to the detected vehicle regarding access the at-grade crossing. These instructions can indicate to the detected vehicle, for example, to wait before traveling through the at-grade crossing, to travel through the at-grade crossing indicative of its safe passage, to activate platooning mode, to increase or decrease to a particular speed before being provided with access to the at-grade crossing, and other instructions. The detected vehicle can then traverse through the at-grade crossing in response to receiving the instruction from the sensors and in response to detecting that the gate of the gate system is activated or open. If the detected vehicle receives an instruction from the sensor to traverse through the at-grade crossing but detects the gate of the gate system closed, then the detected vehicle can wait to traverse through the at-grade crossing until the gate system is activated or opened. Following the detected vehicles traversal through the at-grade crossing, the sensors can detect a location of the detected vehicle in its field of view, determine the vehicle has traversed through the at-grade crossing, and transmit a notification to the gate system to close its gate.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   a central server;
   a gate system configured to provide access for autonomous vehicles to an at-grade crossing;
   a plurality of sensors positioned in a fixed location relative to a roadway, the roadway comprising the at-grade crossing, wherein each sensor in the plurality of sensors is configured to:
   detects one or more autonomous vehicles in a field of view on the roadway, and for each detected vehicle:
      generates sensor data indicative of the detected autonomous vehicle;
      generates observational data based on the generated sensor data;
      determines, from the generated sensor data and the generated observational data, a likelihood that the detected autonomous vehicle will approach the at-grade crossing;

compares the likelihood that the detected autonomous vehicle will approach the at-grade crossing to a threshold value; and in response to determining that the likelihood satisfies the threshold value, transmits data to the gate system that causes the gate system to allow the detected autonomous vehicle access to the at-grade crossing prior to the detected autonomous vehicle reaching the gate system.

2. The system of claim 1, wherein the at-grade crossing comprises a railroad crossing between a first roadway and a second roadway.

3. The system of claim 1, wherein the autonomous vehicles that traverse the roadway comprise autonomous trucks.

4. The system of claim 1, wherein the system comprises:
an interface system for receiving data from a railroad system that manages a railroad, wherein the interface system is configured to display data related to one or more trains that traverse the railroad that traverses the at-grade crossing, the data comprising a number of the one or more trains that traverse the railroad, a direction of the one or more trains traveling the railroad, a number of railroads, and prior train utilization on the railroad.

5. The system of claim 1, wherein the sensor generates the sensor data indicative of the detected autonomous vehicle further comprising:
determines one or more features of the detected vehicle;
determines an identity of the detected vehicle using the one or more features, wherein the one or more features comprise a color of the detected vehicle, a class of the detected vehicle, and a volume of the detected vehicle; and
determines characteristics of a movement of the detected vehicle, wherein the characteristics comprise (i) a direction of the movement, (ii) a velocity of the movement, (iii) an acceleration of the movement, (iv) a prior path taken while traversing the roadway.

6. The system of claim 5, wherein the sensor generates observational data based on the generated sensor data further comprising:
determines a location of the at-grade crossing on the roadway;
determines a distance and direction of the at-grade crossing in relation to a location of the detected vehicle; and
determines traffic characteristics on the roadway, wherein the traffic characteristics comprise (i) velocity of other vehicles traversing the roadway, (ii) a movement direction for each vehicle of the other vehicles, and (iii) objects on the roadway that hinder traffic movement.

7. The system of claim 6, wherein the sensor determines, from the generated sensor data and the generated observation data, the likelihood that the detected autonomous vehicle will approach the at-grade crossing further comprises:
provides (i) data indicative of the generated observational data, (ii) data indicative of the generated sensor data, and (iii) data identifying the detected vehicle using a trained machine-learning model, as input to a trained machine-learning model, the trained machine-learning model configured to produce the likelihood that the detected autonomous vehicle will approach the at-grade crossing; and
obtains, as output from the trained machine-learning model, the likelihood that the detected autonomous vehicle will approach the at-grade crossing prior to the detected autonomous vehicle approaching the at-grade crossing.

8. The system of claim 7, wherein:
the plurality of sensors:
acquires sensor data of one or more trains traversing a railroad prior to or after the at-grade crossing;
determines, from the acquired sensor data, a direction of the one or more trains traversing the railroad;
in response to determining (i) the direction of the one or more trains indicates the one or more trains are traversing towards the at-grade crossing and (ii) the likelihood that the detected autonomous vehicle will approach the at-grade crossing satisfies the threshold value, determines, using the acquired sensor data, (iii) a distance the one or more trains are from the at-grade crossing and (iv) a speed of the one or more trains;
determines whether to provide the detected autonomous vehicle access to the at-grade crossing prior to the one or more trains traversing the at-grade crossing based on (iii) the distance the one or more trains are from the at-grade crossing and (iv) the speed of the one or more trains; and
in response to determining that the detected autonomous vehicle is not provided access to the at-grade crossing prior to the one or more trains traversing the at-grade crossing, instructs the detected autonomous vehicle to wait at the gate system.

9. The system of claim 8, wherein in response to determining that the detected autonomous is provided access to the at-grade crossing prior to the one or more trains traversing the at-grade crossing, the plurality of sensors:
transmits data to the gate system that causes the gate system to allow the detected autonomous vehicle access to the at-grade crossing prior to the detected autonomous vehicle reaching the gate system and prior to the one or more trains reaching the at-grade crossing; and
transmits, to the detected autonomous vehicle, data indicative of safe passage across the at-grade crossing.

10. The system of claim 8, wherein in response to determining, using the acquired sensor data, (iii) the distance the one or more trains are from the at-grade crossing and (iv) the speed of the one or more trains, the plurality of sensors:
determines a prior number of openings of the gate system over a prior predetermined time period;
in response to determining the prior number of openings of the gate system over the prior predetermined time period satisfies a second threshold, transmits data to the detected autonomous vehicle to activate platooning mode, wherein the platooning mode instructs the autonomous vehicle to wait to access the at-grade crossing until a predetermined number of autonomous vehicles have platooned with the detected autonomous vehicle;
detects the number of autonomous vehicles in the platooning mode satisfies a third threshold value;
transmits data to the gate system the causes the gate system to allow the platooned autonomous vehicles access to the at-grade crossing; and
transmits data to each autonomous vehicle of the platooned autonomous vehicle indicative of safe passage across the at-grade crossing.

11. The system of claim 8, wherein in response to determining whether to provide the detected autonomous vehicle access to the at-grade crossing prior to the one or more trains traversing the at-grade crossing based on (iii) the distance the one or more trains are from the at-grade crossing and (iv) the speed of the one or more trains, the plurality of sensors:
determines a current speed of the detected vehicle approaching the gate system;
determines the current speed of the detected vehicle is not sufficient to traverse the at-grade crossing prior to the one or more trains traversing the at-grade crossing;
determines a new speed for the detected vehicle that is sufficient to traverse the at-grade crossing prior to the one or more trains traversing the at-grade crossing;
transmits the new speed to the detected vehicle;
in response to transmitting the new speed to the detected vehicle, detects the current speed of the detected vehicle matches to the transmitted new speed; and
in response to detecting the current speed of the detected vehicle matches to the transmitted new speed, transmits data to the gate system that causes the gate system to allow the detected vehicle access to cross the at-grade crossing.

12. A computer-implemented method comprising:
providing, by a gate system, access for autonomous vehicles to an at-grade crossing;
detecting, by each sensor in a plurality of sensors positioned in a fixed location relative to a roadway, one or more autonomous vehicles in a field of view on the roadway, and for each detected autonomous vehicle:
generating sensor data indicative of the detected autonomous vehicle;
generating observational data based on the generated sensor data;
determining, from the generated sensor data and the generated observational data, a likelihood that the detected autonomous vehicle will approach the at-grade crossing;
comparing the likelihood that the detected autonomous vehicle will approach the at-grade crossing to a threshold value; and
in response to determining that the likelihood satisfies the threshold value, transmitting data to the gate system that causes the gate system to allow the detected autonomous vehicle access to the at-grade crossing prior to the detected autonomous vehicle reaching the gate system.

13. The computer-implemented method of claim 12, wherein the at-grade crossing comprises a railroad crossing between a first roadway and a second roadway.

14. The computer-implemented method of claim 12, wherein the autonomous vehicles that traverse the roadway comprise autonomous trucks.

15. The computer-implemented method of claim 12, further comprising:
receiving, at an interface system, data from a railroad system that manages a railroad; and
displaying, at the interface system, data related to one or more trains that traverse the railroad that traverses the at-grade crossing, the data comprising a number of the one or more trains that traverse the railroad, a direction of the one or more trains traveling the railroad, a number of railroads, and prior train utilization on the railroad.

16. The computer-implemented method of claim 12, wherein generating the sensor data indicative of the detected autonomous vehicle further comprises:
determining, by the plurality of sensors, one or more features of the detected vehicle;
determining, by the plurality of sensors, an identity of the detected vehicle using the one or more features, wherein the one or more features comprise a color of the detected vehicle, a class of the detected vehicle, and a volume of the detected vehicle; and
determining, by the plurality of sensors, characteristics of a movement of the detected vehicle, wherein the characteristics comprise (i) a direction of the movement, (ii) a velocity of the movement, (iii) an acceleration of the movement, (iv) a prior path taken while traversing the roadway.

17. The computer-implemented method of claim 16, wherein generating the observational data based on the generated sensor data further comprises:
determining, by the plurality of sensors, a location of the at-grade crossing on the roadway;
determining, by the plurality of sensors, a distance and direction of the at-grade crossing in relation to a location of the detected vehicle; and
determining, by the plurality of sensors, traffic characteristics on the roadway, wherein the traffic characteristics comprise (i) velocity of other vehicles traversing the roadway, (ii) a movement direction for each vehicle of the other vehicles, and (iii) objects on the roadway that hinder traffic movement.

18. The computer-implemented method of claim 17, wherein determining, from the generated sensor data and the generated observational data, the likelihood that the detected autonomous vehicle will approach the at-grade crossing further comprises:
providing, by the plurality of sensors, (i) data indicative of the generated observational data, (ii) data indicative of the generated sensor data, and (iii) data identifying the detected vehicle using a trained machine-learning model, as input to a trained machine-learning model, the trained machine-learning model configured to produce the likelihood that the detected autonomous vehicle will approach the at-grade crossing; and
obtaining, by the plurality of sensors, as output from the trained machine-learning model, the likelihood that the detected autonomous vehicle will approach the at-grade crossing prior to the detected autonomous vehicle approaching the at-grade crossing.

19. The computer-implemented method of claim 18, further comprising:
acquiring, by the plurality of sensors, sensor data of one or more trains traversing a railroad prior to or after the at-grade crossing;
determining, by the plurality of sensors and from the acquired sensor data, a direction of the one or more trains traversing the railroad;
in response to determining (i) the direction of the one or more trains indicates the one or more trains are traversing towards the at-grade crossing and (ii) the likelihood that the detected autonomous vehicle will approach the at-grade crossing satisfies the threshold value, determining, by the plurality of sensors and using the acquired sensor data, (iii) a distance the one or more trains are from the at-grade crossing and (iv) a speed of the one or more trains;
determining, by the plurality of sensors, whether to provide the detected autonomous vehicle access to the at-grade crossing prior to the one or more trains traversing the at-grade crossing based on (iii) the distance the one or more trains are from the at-grade crossing and (iv) the speed of the one or more trains; and in response to determining that the detected autonomous vehicle is not provided access to the at-grade crossing prior to the one or more trains traversing the at-grade crossing, instructing, by the plurality of sensors, the detected autonomous vehicle to wait at the gate system.

20. One or more non-transitory machine-readable media storing instructions that, when executed by one or more processing devices, cause the one or more processing devices to perform operations comprising:

providing, by a gate system, access for autonomous vehicles to an at-grade crossing;

detecting, by each sensor in a plurality of sensors positioned in a fixed location relative to a roadway, one or more autonomous vehicles in a field of view on the roadway, and for each detected autonomous vehicle:
generating sensor data indicative of the detected autonomous vehicle;
generating observational data based on the generated sensor data;
determining, from the generated sensor data and the generated observational data, a likelihood that the detected autonomous vehicle will approach the at-grade crossing;
comparing the likelihood that the detected autonomous vehicle will approach the at-grade crossing to a threshold value; and
in response to determining that the likelihood satisfies the threshold value, transmitting data to the gate system that causes the gate system to allow the detected autonomous vehicle access to the at-grade crossing prior to the detected autonomous vehicle reaching the gate system.

\* \* \* \* \*